(12) United States Patent
Waddington et al.

(10) Patent No.: US 8,813,047 B2
(45) Date of Patent: Aug. 19, 2014

(54) YET ANOTHER TRANSFORMATION LANGUAGE (YATL)

(75) Inventors: Daniel G. Waddington, Tinton Falls, NJ (US); Bin Yao, Middletown, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 3229 days.

(21) Appl. No.: 11/222,418

(22) Filed: Sep. 8, 2005

(65) Prior Publication Data
US 2007/0055966 A1    Mar. 8, 2007

(51) Int. Cl.
*G06F 9/45*    (2006.01)

(52) U.S. Cl.
USPC ............................. 717/140; 717/144; 717/147

(58) Field of Classification Search
USPC ........................ 717/136–161; 707/1, 100, 102
See application file for complete search history.

(56) References Cited

U.S. PATENT DOCUMENTS 6,163,882 A * 12/2000 Masuyama et al. ........... 717/154
6,314,562 B1 * 11/2001 Biggerstaff ................... 717/156
6,546,549 B2 * 4/2003 Li ................................. 717/137

OTHER PUBLICATIONS

Patrascoiu, YATL: Yet Another Transformation Language—Reference Manual Version 1.0; University of Kent at Canterbury Published by the Computing Laboratory, University of Kent; Technical Report No. 2-04 Mar. 2004; pp. 1-45.*

Anisko et al., Transformers: a C++ program transformation framework; Technical Report No. 0310, revision 1, May 2004; pp. 1-40.*
U.S. Appl. No. 11/093,530, filed Mar. 30, 2005, Waddington.
U.S. Appl. No. 11/093,517, filed Mar. 30, 2005, Waddington.
U.S. Appl. No. 11/093,518, filed Mar. 30, 2005, Waddington.
J. R. Cordy, C. D. Halpern, and E. Promislow. TXL: A Rapid Prototyping System for Programming Language Dialects. Computer Languages, 16(1):97-107, Jan. 1991.
M. G. J. van den Brand, P. Klint, H. A. de Jong, and P. A. Olivier. Efficient Annotated Terms. Software Practice and Experience, 30(3):259-291, 2000.
E. Visser. Stratego: A Language for Program Transformation Based on Rewriting Strategies. Lecture Notes in Computer Science, 2051:357, 2001.
E. Visser. Stratego Reference Manual—version 0.5.2. Institute of Information and Computing Science, University of Utrecht, 2001.
D. G. Waddington and B. Yao. High-Fidelity C/C++ Code Transformation. In Proceedings of the Fifth Workshop on Language Descriptions, Tools, and Applications, pp. 6-25, 2005.
J. R. Cordy, TXL—A Language for Programming Language Tools and Applications, Proc. LDTA 2004, ACM 4th International Workshop on Language Descriptions, Tools and Applications, Barcelona, Apr. 2004, pp. 1-27.
J.R. Cord TXL Programming Language, Technical Manual, Version 10.4, Jan. 2005.

* cited by examiner

*Primary Examiner* — Satish Rampuria
(74) *Attorney, Agent, or Firm* — Wall & Tong, LLP

(57) ABSTRACT

A practical language for writing analysis and transformation tools for C/C++ and other languages is provided. This language, YATL, is imperative in style and designed to be easy to use for someone familiar with the grammar of the target language. It allows the developer to describe transformations with reference to elements of the target grammar through a pluggable personality to a compiler. This provides the means for powerful, yet easy to write, transformation programs, while fundamentally remaining language agnostic.

24 Claims, 24 Drawing Sheets

CONVENTIONAL AST

AST + LITERAL

FULL LL-AST

```
program:
| rule program
| function_definition program
| callback_function_definition program
| preprocessor_directive program
| stratego_program program
;
```

```
stratego_program:
  inline_stratego
;
```

```
rule:
  "rule" IDENTIFIER
  rule_parameters compound_statement
;
```

```
rule_parameters:
| '('
| '(' ')'
;
```

```
function_definition:
  "sub" IDENTIFIER
  function_parameters compound_statement
;
```

```
function_parameters:
| '('
| '(' ')'
;
```

```
compound_statement:
  '{' yatl_statements '}'
| '{' '}'
| compound_statement ';'
;
```

FIG. 3A

```
yatl_statements:
  yatl_statement
| compound_statement else_clause
| yatl_statements yatl_statement
;
```

```
/**************************************************/
/* fail_statement                                 */
/**************************************************/ fail_statement:
  "fail" ';'
;
```

```
/**************************************************/
/* else clause                                    */
/**************************************************/
else_clause:
  "else" else_action
;

else_action:
  compound_statement
| yatl_statement
;
```

FIG. 3B

```
yatl_statement:
  foreach_match_statement
| match_once_statement
| match_once_statement else_clause
| match_statement
| match_statement else_clause
| foreach_element_statement
| debug_statement ';'
| native_statement ';'
| native_statement ';' else_clause
| print_statement ';'
| log_statement ';'
| expression_statement ';' else_clause
| expression_statement ';'
| isolated_statement
| continue_statement ';'
| die_statement ';'
| on_statement
| statement_insertion_statement ';'
| layout_insertion_statement ';'
| if_statement
| while_statement
| do_while_statement
| for_statement
| delete_statement ';'
| transform_decl_statement ';'
| transform_use_statement ';'
| replace_with_statement ';'
| return_statement ';'
| trycatch_statement
| either_or_statement
| fail_statement
| on_file_statement
| ptr_declare ';'
;
```

```
/****************************************************/
/* on_file_statement                    */
/****************************************************/ on_file_statement:
  "on-file" STRING_LITERAL compound_statement
;
```

```
/****************************************************/
/* ptr_declare                          */
/****************************************************/
ptr_declare:
  "declare" YATL_PTR
```

```
/****************************************************/
/* foreach_element_statement            */
/****************************************************/ foreach_element_statement:
  "foreach-element" compound_statement
;
```

```
/****************************************************/
/* either_or_statement                  */
/****************************************************/ either_or_statement:
  "either" compound_statement
  "or" compound_statement either_or_tail
;

either_or_tail:
| "or" compound_statement either_or_tail
;
```

```
/****************************************************/
/* trycatch_statement                   */
/****************************************************/
trycatch_statement:
  "try" compound_statement
  "catch" compound_statement
;
```

FIG. 3E

```
/***************************************************/
/* replace_with_statement                          */
/***************************************************/
replace_with_statement:
  "replace-with" expression
;
```

```
/***************************************************/
/* return_statement                                */
/***************************************************/
return_statement:
  "return" expression
;
```

```
/***************************************************/
/* delete_statement                                */
/***************************************************/
delete_statement:
  "delete" "at" pointer_dereference
;
```

```
/***************************************************/
/* if_statement                                    */
/***************************************************/
if_statement:
  "if" '(' expression ')'
  compound_statement if_tail
;

if_tail:
| elif if_tail
| else_tail
;

elif:
  "elsif" '(' expression ')' compound_statement if_tail
;

else_tail:
  "else" compound_statement
;
```

```
/****************************************************/
/* while_statement                                  */
/****************************************************/
while_statement:
  "while" '(' expression ')' compound_statement
  ;
```

```
/****************************************************/
/* do_while_statement                               */
/****************************************************/
do_while_statement:
  "do" compound_statement
    "while" '(' expression ')' ';'
  ;
```

```
/****************************************************/
/* for_statement                                    */
/****************************************************/
for_statement:
  "for" '(' for_init_statement expression ';' expression ')' compound_statement
  ;

for_init_statement:
  yatl_statement
  ;
```

```
/****************************************************/
/* statement_insertion_statement                    */
/****************************************************/
statement_insertion_statement:
  "insert-statement" expression insertion_position
  ;
```

```
/******************************************************/
/* layout_insertion_statement           */
/******************************************************/
layout_insertion_statement:
  "insert-layout" layout_element insertion_position
;

layout_element:
  STRING_LITERAL { gAst.AddLeaf("term_string",gSym.next()); }
;

insertion_position:
  "after" YATL_PTR
| "before" YATL_PTR { gAst.AddLeafFront("before",gSym.tt_next()); }
;
```

```
/******************************************************/
/* on statement - sugar                 */
/******************************************************/
on_statement:
  "on" term_expression compound_statement
| "on" on_ptr_deref compound_statement
;

on_ptr_deref:
  YATL_PTR
;

pointer_dereference:
  YATL_PTR
;
```

```
/******************************************************/
/* isolate statement                    */
/******************************************************/
isolated_statement:
  "isolate" yatl_statement
| "isolate" compound_statement
;
```

```
/***************************************************/
/* die statement                                   */
/***************************************************/
die_statement:
  "die" string_parameter
;
```

```
/***************************************************/
/* continue statement                              */
/***************************************************/
continue_statement:
  "continue"
;
```

```
/***************************************************/
/* preprocessor directives                         */
/***************************************************/
preprocessor_directive:
  "import" STRING_LITERAL
;
```

```
/***************************************************/
/* EXPRESSIONS                                     */
/***************************************************/ expression:
  apply_expression
| '(' expression ')'
| assignment_expression
| term_expression
| new_expression
| match_cond_expression
| logical_expression
| '!' expression
| arithmetic_expression
| conditional_expression
| unary_expression
| pointer_dereference
;

expression_statement:
  expression
;
```

FIG. 3H

```
unary_expression:
  YATL_VAR "++"
| YATL_VAR "--"
;
```

```
arithmetic_expression:
  expression '+' expression
|
  expression '-' expression
|
  expression '*' expression
|
  expression '/' expression
|
  expression '%' expression
;
```

```
conditional_expression:
  expression '>' expression
|
  expression '<' expression
|
  expression "<=" expression
|
  expression ">=" expression
|
  expression "!=" expression
|
  expression "==" expression
;
```

FIG. 3I

```
logical_expression:
  logical_and_expression
| logical_or_expression
;

logical_and_expression:
  expression "&&" expression
;

logical_or_expression:
  expression "||" expression
;

assignment_expression:
  YATL_VAR '=' assignment_rhs
| YATL_PTR '=' assignment_rhs
| '?' '(' assignment_var_list ')' '=' assignment_rhs
;

assignment_var_list:
  YATL_VAR
| assignment_var_list ',' YATL_VAR
;

assignment_rhs:
  expression
;
```

```
/****************************************************/
/* new expression                                   */
/****************************************************/
new_expression:
  "new" super_type_construction
;

super_type_construction:
  '(' IDENTIFIER ':' constructor_parameters ')'
;
```

FIG. 3J

```
/************************************************/
/* apply statement                              */
/************************************************/ apply_expression:
  "apply" apply_parameters
;

apply_parameters:
  apply_parameter apply_operator apply_parameters
| apply_parameter
;

apply_parameter:
  IDENTIFIER
| IDENTIFIER '(' function_call_parameters ')'
;

apply_operator: ">>"
;
```

```
/************************************************/
/* function call                                */
/************************************************/ function_call:
  IDENTIFIER '(' function_call_parameters ')'
;

function_call_parameters:
| function_call_param ',' function_call_parameters
| function_call_param
;

function_call_param:
  stratego_strategy
| IDENTIFIER
| FUNCTION_QUALIFIER IDENTIFIER
| SUB_QUALIFIER IDENTIFIER
| RULE_QUALIFIER IDENTIFIER
| expression
;
```

FIG. 3K

```
/*******************************************/
/* method call - sugar: $v.f(x) == $v = f($v,x)   */
/*******************************************/
method_call:
  YATL_VAR '.' IDENTIFIER '(' function_call_parameters ')'
  ;
```

```
/*******************************************/
/* expressions                    */
/*******************************************/

/* an expression that forms a Stratego term - cannot be a , seperated sequence */ term_expression:
 '<' term_sequence '>'
 | '@' '(' term_sequence ')'
 | term_element
 ;

term_sequence:
  term_sequence ',' term_element
 | term_element
 ;
```

```
/* an element that is used to form a term */
term_element:
  YATL_VAR
 | INTEGER
 | STRING_LITERAL
 | stratego_aterm
 | function_call
 | method_call
 ;
```

```
stratego_aterm:
  '|' aterm '|'
 ;
```

FIG. 3L

```
aterm:
   IDENTIFIER '(' aterm ')'
| '(' aterm ')'
| STRING_LITERAL
| INTEGER
| aterm ',' aterm
| '_'
| ATERM_NONE
| '[' aterm ']'
| '[' ']'
;
```

```
stratego_strategy:
   '|' '?' aterm '|'
| '|' '!' aterm '|'
;
```

```
/* variable comma seperated list for parameter passing */
parameter_csl:
   parameter_csl_member ',' parameter_csl
| parameter_csl_member
;
```

```
parameter_csl_member:
   YATL_VAR
| IDENTIFIER
| FUNCTION_QUALIFIER IDENTIFIER
| RULE_QUALIFIER IDENTIFIER
| SUB_QUALIFIER IDENTIFIER
;
```

```
/*****************************************************/
/* transform_decl_statement               */
/*****************************************************/ transform_decl_statement:
  "transform-decl" IDENTIFIER "where" IDENTIFIER
;

/*****************************************************/
/* transform_use_statement                */
/*****************************************************/ transform_use_statement:
  "transform-use" IDENTIFIER "where" IDENTIFIER
;
```

```
/*****************************************************/
/* print statement                        */
/*****************************************************/ print_statement:
  "print" string_parameter
;
```

```
/*****************************************************/
/* log statement                          */
/*****************************************************/ log_statement:
  "log" string_parameter
;
```

```
/*****************************************************/
/* foreach_match statement                */
/*****************************************************/ foreach_match_statement:
  "foreach-match" super_type_specifiers match_actions
| "foreach-match-rl" super_type_specifiers match_actions
| "foreach-match-bottomup" super_type_specifiers match_actions
;
```

```
/****************************************************/
/* match statements                                 */
/****************************************************/ match_once_statement:
  match_once_expression match_actions
;

match_statement:
  match_exact_expression match_actions
;
```

```
/****************************************************/
/* match expressions                                */
/****************************************************/ match_once_expression:
  "match-once" super_type_specifiers
| "match-once-rl" super_type_specifiers
| "match-once-bu" super_type_specifiers
;
```

```
match_exact_expression:
  "match" super_type_specifiers
;
```

```
match_expression:
  match_once_expression
| match_exact_expression
;
```

```
match_cond_expression:
  match_expression
| using_qualifier match_expression
;
```

```
using_qualifier:
  "using" expression
;
```

FIG. 30

```
super_type_specifiers:
  super_type_specifier log_or
;
```

```
log_or:
| "||" super_type_specifiers
;
```

```
super_type_specifier:
  '(' IDENTIFIER ':' constructor_parameters ')'
|
  '(' expression ')'
;
```

```
match_actions:
  compound_statement
;
```

```
constructor_parameters:
| cp_csl
;
```

```
/* A mixed comma seperated list is a bracketed list of yatl vars or terminal tokens */
cp_csl:
  cp_csl_specifier ',' cp_csl
| cp_csl_specifier
;
```

```
cp_csl_specifier:
  match_criteria field_specifier
;
```

```
match_criteria:
  '{' match_criteria_list '}'
| '{''}'
;
```

```
match_criteria_list:
  match_criteria_element ',' match_criteria_list
| match_criteria_element
;
```

FIG. 3P

```
match_criteria_element:
  TERMINAL_TOKEN
| YATL_VAR
| YATL_PTR_BINDING
| YATL_VAR_BINDING
| STRING_LITERAL
| INTEGER
;
```

```
field_specifier:
  '<' IDENTIFIER field_attributes '>'
| '<' LIST_DOTDOTDOT field_attributes '>'
| '<' field_attributes '>'
|
;
```

```
/* field attributes can be attached to a named super-type constructor parameters */
field_attributes:
| ':' field_attribute_list
;
```

```
field_attribute_list:
  field_attribute ',' field_attribute
| field_attribute
;
```

```
field_attribute:
  IDENTIFIER
;
```

```
debug_statement: "debug"
;
```

```
native_statement: "native" string_parameter
;
```

```
string_parameter:
  STRING_LITERAL
| token_sequence
;
```

```
token_sequence:
| TERMINAL_TOKEN token_sequence
;
```

FIG. 3Q

YET ANOTHER TRANSFORMATION LANGUAGE (YATL)

FIELD OF THE INVENTION

The present invention relates generally to the field of computer software and, in particular, relates to meta-programming and domain-specific programming languages for writing source code transformations.

BACKGROUND OF THE INVENTION

The proliferation of large and complex computer programs has made source code transformation solutions increasingly attractive. Source code transformations are a form of meta-programming. Machine drive analysis and modification can relieve the manual developer of much of the burden of repetitive change. However, for source code transformation to be successful, the developer must be able to clearly define what and how modifications should be made. Herein lies the need for a transformation programming language.

Existing languages cannot attain high-fidelity. Many existing languages require expertise in the use of functional or other programming paradigms that are not intuitive for developers familiar with procedural languages. Existing languages are too generalized and focus on rewriting abstract syntax trees (AST) in a general form, without any provision for target language awareness in the transform language, resulting in a lack of expressiveness. Existing languages are not sufficiently powerful and flexible. Existing languages are based on the specification of rules in the form of predicates and actions. This limits the usefulness of the language and the ability to perform auxiliary calculations.

SUMMARY

Various deficiencies of the prior art are addressed by various exemplary embodiments of the present invention of a programming language, YATL, for writing source code transformation tools for a target language, such as C/C++.

One embodiment is a method for generating analysis and transformation tools. One or more YATL program(s) for transforming ASTs are stored on a storage medium. The ASTs correspond to target source code. The YATL program(s) are compiled to produce one or more transformation program(s). The transformation program(s) are executed with the ASTs as input to produce a number of transformed ASTs. The YATL program includes a tree traversal routine having access to a target symbol table. The target symbol table holds symbols from the target source code, where each symbol is associated with a unique scope identifier. A scope is a programming language term to denote a range of existence for a symbol.

Another embodiment is a system for generating analysis and transformation tools, including YATL programs, a YATL compiler, a YATL parser, a run time, one or more storage device(s), and a processor. The YATL compiler compiles the YATL programs and the YATL parser parses the YATL programs using a YATL grammar. The run time is an environment for executing YATL programs. The storage device(s) store the YATL programs, YATL compiler, YATL parser, and run time. The processor compiles and executes the YATL programs. The YATL programs operate on ASTs to produce transformed ASTs. One of the YATL programs includes a tree traversal routine that has access to a target symbol table. The target symbol table holds symbols from the target source code, where each symbol is associated with a unique scope identifier. The YATL program includes an "on" construct for altering a tree temporarily for a single action, a "using" construct for altering a tree for the duration of a compound statement, and a variable reference construct for permanently altering a tree across rules and functions.

Another embodiment is a computer-readable medium that stores instructions for performing a method for generating analysis and transformation tools. The instructions include a YATL program that has one or more statement(s). Each statement is one of the following: a rule, a function definition, a callback function definition, a preprocessor directive, or a Stratego program. The rule includes "rule" followed by an identifier, rule parameters, and a compound statement. The function definition includes "sub" followed by the identifier, function parameters, and the compound statement. The compound statement includes at least one YATL statement optionally followed by an else clause. The YATL program includes a tree traversal routine having access to a target symbol table. The target symbol table holds symbols from a target source code, where each symbol is associated with a unique scope identifier.

BRIEF DESCRIPTION OF THE DRAWINGS

The teachings of the present invention can be readily understood by considering the following detailed description in conjunction with the accompanying drawings:

FIGS. 3A-3Q form one block diagram showing a grammar for an exemplary embodiment of YATL;

FIG. 6A illustrates an action directly on a current tree, while

DETAILED DESCRIPTION OF THE INVENTION

The invention will be primarily described within the general context of an exemplary embodiment of a programming language, YATL, for writing source code transformation tools for any kind of target language, such as C/C++. However, those skilled in the art and informed by the teachings herein will realize that the invention encompasses obvious changes in grammar and syntax and is directed to the broad concepts implemented by the exemplary grammar, syntax, and constructs described. Exemplary embodiments of YATL have a wide variety of applications in automated source transformation, including redundant code removal, dead code removal, code refactoring, platform and application programming interface (API) migration, debugging, instrumentation and fault detection, performance analysis instrumentation, bug rectification, source code watermarking, security hole identification, software fortification, and many other applications.

An exemplary embodiment of a programming language, YATL, for writing source code transformation tools for a target language, such as C/C++ is provided. YATL allows developers to specify and realize algorithms that both analyze and transform source code. Developers use YATL to write tools that perform analysis and modification of abstract syntax trees and their hybrid forms. YATL allows the developer to describe transformations with reference to elements of the target language grammar, making powerful transformation easy to specify. YATL is target language agnostic through a compartmentalized piece of syntax that can be implemented as a pluggable "personality" of the compiler. YATL is PERL-like in style, e.g., typeless and procedural. Unlike existing code transformation languages, YATL does not require any prior knowledge of computation linguistics and transformation programming techniques. Writing YATL transformations is intended to be easy for anyone who can write C and C++ programs.

In this exemplary embodiment, a YATL system provides primitives and run-time support for many capabilities, including the following: template-based searching of program constructs (through tree traversal) specific to the target language; program construction through templates and/or by example; basic flow control and failure handling; basic data handling (e.g., integers, strings, lists); extensibility through direct access to the back-end intermediate representation (e.g., Stratego and C); access to underlying operating system facilities (e.g., console I/O); and support for target language symbol tables, among others.

Figure 1:
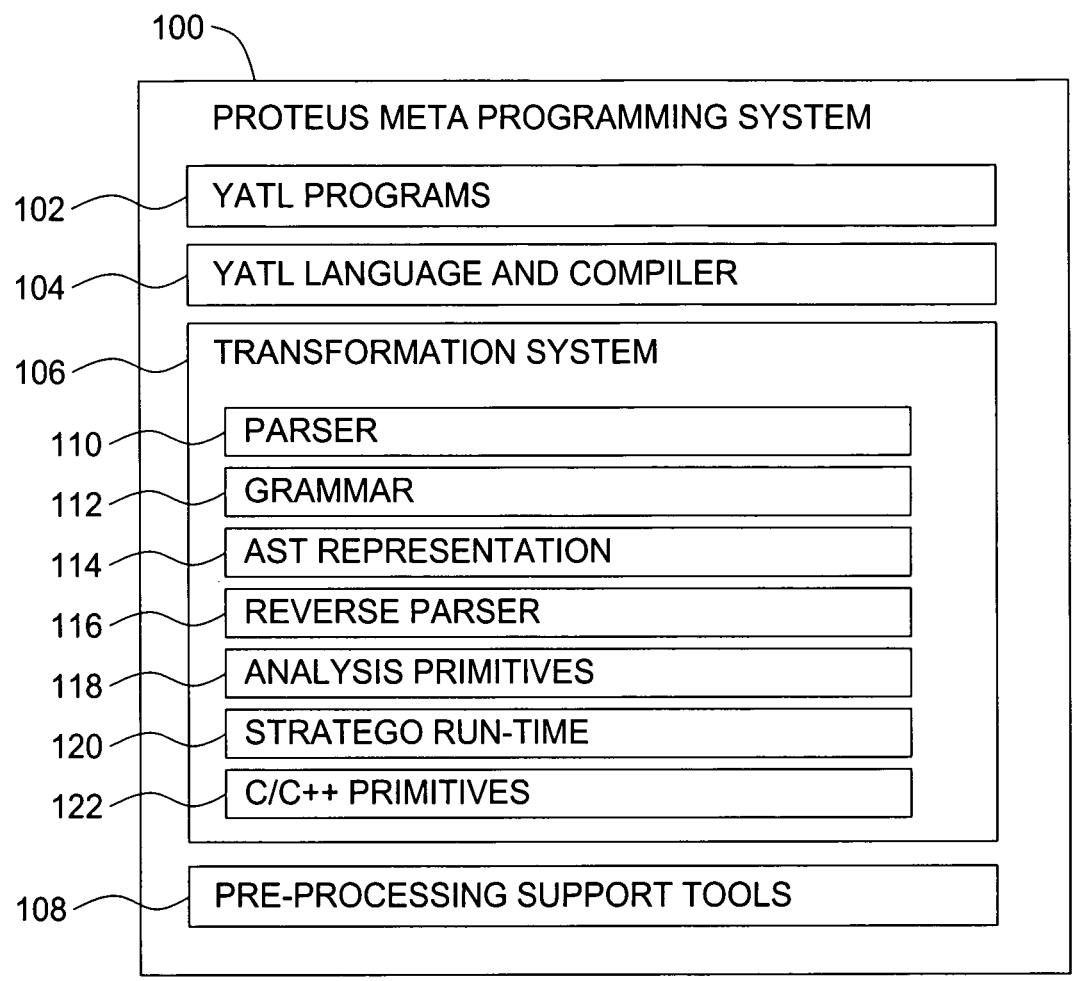
FIG. 1 is a block diagram showing an exemplary meta-programming environment including exemplary embodiments of YATL.

FIG. 1 shows an exemplary meta-programming environment including exemplary embodiments of YATL. In this example, a system 100 called Proteus is a meta-programming environment designed at Bell Laboratories to help automate changes to legacy C and C++ software. The system 100 includes YATL programs 102, the YATL language and compiler 104, a transformation system 106, and pre-processing support tools 108. The transformation system in this example includes a parser 110, a grammar 112, an AST representation 114, a reverse parser 116, analysis primitives 118, a Stratego run-time 120, and C/C++ primitives 122. Other embodiments of YATL may operate in various other systems having various different components.

In this exemplary embodiment, the YATL compiler takes YATL programs and builds a transformation tool executable. Some exemplary command line options for the YATL compiler include generating only backend (e.g., Stratego) code, not using precompiled binaries for run-time, specifying an input source file, specifying output file, whether to keep intermediate files, optimization levels, and whether to turn on debugging.

An exemplary process for using the meta-programming environment is as follows. A source program is given (e.g., myprog.cpp). Then, the YATL program is written (e.g., simple.yatl). The transformation tool is generated (e.g., simple). An XML project file is created that coordinates the execution of the transformation tool with respect to the target source files. The tool (e.g., simple) is executed, which applies the transformation to the source program. Transformed programs are output to the output file (e.g., myprog.cpp.out). Each of the tools that are generated from the YATL compiler is a stand-alone executable in themselves. They are designed to be efficient and tailored for rapid execution.

Figure 2A:
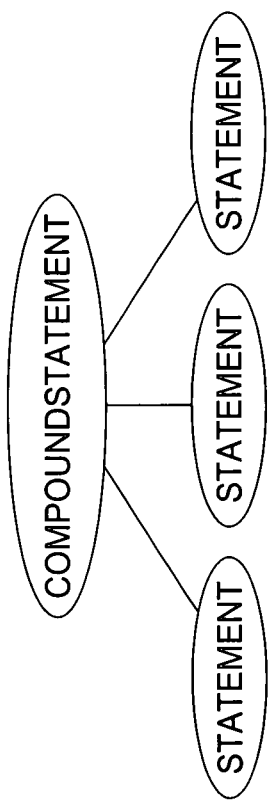
FIGS. 2A, 2B, and 2C illustrate an exemplary literal layout abstract syntax tree (LL-AST)
Figure 2B:
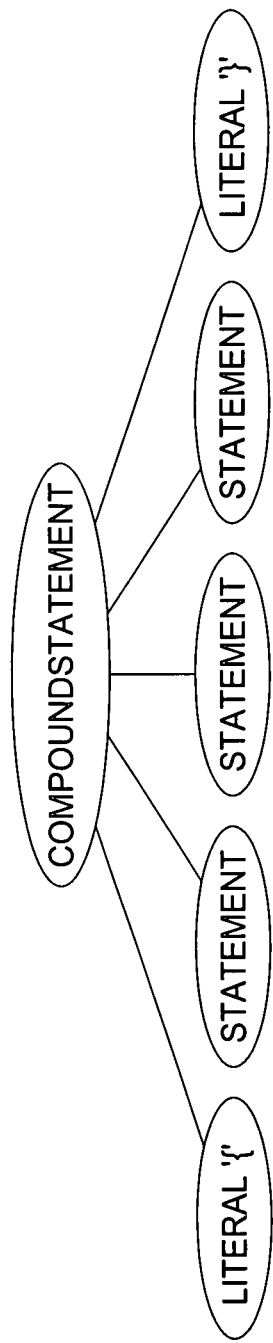
Figure 2C:
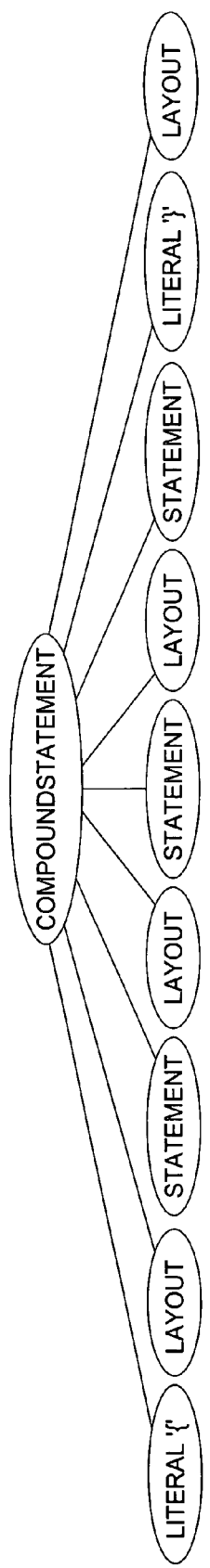

FIGS. 2A, 2B, and 2C illustrate an exemplary literal layout abstract syntax trees (LL-AST). Creating LL-ASTs is kind of like diagramming sentences in English class, only for program statements. While the YATL developer need not understand LL-ASTs, YATL programs operate on LL-ASTs. This exemplary embodiment of YATL uses a specialized form of ASTs, which retain literal and layout information. A target source program can be represented by LL-ASTs and the target source program can be reconstructed from the LL-ASTs with no information lost. ATerms are the basis for the LL-AST implementation, in this exemplary embodiment. This provides a simple scheme for textual and binary terminal tree representations. FIG. 2A shows a conventional AST which is augmented with literals (e.g., keywords) defined by the grammar to form FIG. 2B. A compound statement in the target language is defined as the literal "{" followed by a sequence of zero or more statements, followed by the literal "}". Thus, the compound statement AST node representing the production with literal information now has two additional children in FIG. 2B. All other lexical symbols are either layout information (i.e., white space) commenting, or preprocessing directives. This information is added to the AST in the form of layout nodes, as shown in FIG. 2C. Layout can exist anywhere in the source program and is, therefore, interlaced between every child node (including literals) within the tree. Although the LL-AST may seem relatively complex, the developer is shield from this complexity, because exemplary embodiments of YATL provide abstractions over the LL-ASTs known as super-types (described below).

FIGS. 3A-3Q show a grammar for an exemplary embodiment of YATL. Other embodiments may have variations in the grammar or have different grammars that include the same basic concepts. The exemplary grammar of FIGS. 3A-3Q is also shown in Table 79.

1 Introduction

Automated source code transformation (a/k/a source transformation) is defined as the machine executed modification of program source code that is directed by automated program analysis. As a software development paradigm, source code transformation can be used to generate tools that reduce timeframes and lower costs for a wide array of software maintenance tasks. Examples include software migration (porting), debugging, and profiling instrumentation, redundant code removal, security vulnerability remediation and design refactoring (e.g., conversion to object-oriented design).

For many companies, a significant portion of software development is done in the C and C++ programming languages. Furthermore, it is source code written in these two languages that is predominantly involved in the software maintenance tasks listed above.

The term target language means the language that is the subject of transformation and the term transformation language describes the meta-programming language itself (i.e., YATL). Furthermore, the phrase source code transformation means a class of meta-programming that includes both static analysis and program modification.

In one embodiment of YATL, design considerations included the degree that the language allows a developer to express his or her intent with respect to the domain (e.g., source code transformation); how much of the functionality of the program is expressed by its source code, the extent that the language naturally allows the developer to avoid repetition and excess levels of verbosity, and how intuitive the language is to the user. Many existing transformation languages are target language agnostic; that is they are designed for writing transformations on nay target language. Examples include TXL and Stratego. Such generic languages are often cumbersome to use practically because making reference to elements of the target language grammar is difficult to do.

2 YATL Compiler and Back-End

Figure 4:
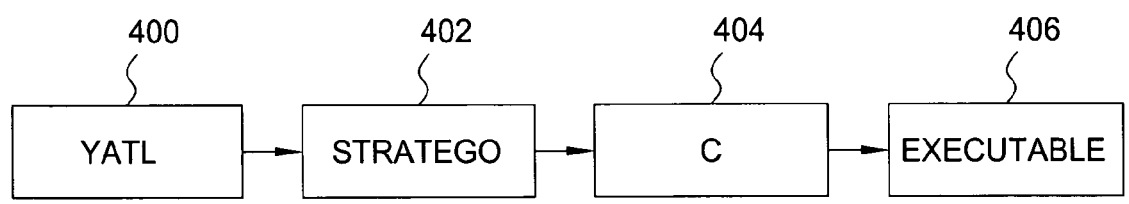
FIG. 4 is a flow chart showing the YATL compiler sequence for an exemplary embodiment.

FIG. 4 shows the YATL compiler sequence for an exemplary embodiment. In this embodiment, the YATL language 400 is compiled into Stratego 402, which is a functional programming language that provides basic primitives for tree manipulation. Stratego programs 402 themselves are compiled into C 404, which in turn is compiled into the executable 406. Other embodiments are compiled into other kinds of code, such as directly into C. Because developers find functional languages, such as Stratego difficult to use, Stratego is not used to write program transformations.

Stratego's ability to interface with native functions, written in C, provides excellent means for extensibility. Most of the back-end logic of Proteus was implemented in Stratego or C, with some elements in YATL itself. Other embodiments may be implemented in many other kinds of code.

3 Variables And Types

One exemplary embodiment of YATL is typeless; there is no type-checking by the compiler. All data is represented as an ATerm tree (or a forest of trees). Variables are not declared, but like PERL, memory is allocated when the variable is first used. All variable identifiers are prefixed with '$'. An exemplary code excerpt for variable initialization is shown in Table 1.

TABLE 1

Exemplary code excerpt for variable initialization

```
/* variable initialization */
$v = "return to sender";      // string
$w = 4;                       // basic integer
$x = |[1,2,3]|;               // list
$z = 3.1243;                  // real number
```

In this exemplary embodiment, introspection, which allows one to determine the type of data, is supported through method call style invocations on the variables. An exemplary code excerpt for variable introspection is shown in Table 2.

TABLE 2

Exemplary code excerpt for variable introspection

```
/* variable introspection */
if ($v.is__string( ))    { print "$v is a string"; }
if ($v.is__list( ))      { print "$v is a list"; }
if ($v.is__int( ))       { print "$v is an integer"; }
if ($v.is__real( ))      { print "$v is a real number"; }
if ($v.is__blob( ))      { print "$v is a blob"; }
elsif ( ! $v.is__assigned( )) {print "$v is not assigned"; }
```

In this exemplary embodiment, the basic YATL types are string, list, integer, real number and blob (size, buffer pair). Other embodiments can have many different kinds of types.

3.1 Working with Trees

In this exemplary embodiment, the basis for transformation in this embodiment of YATL is the modification of target program representations in the form of abstract syntax trees (ASTs). At any point in a YATL program, there is the notion of the current tree, i.e., the piece of data that is being modified. The piece of data is a tree representing a program in whole or in part. The current tree is accessible through the special variable $_. If the YATL programmer wishes to change the subject of modification, the programmer can either alter the current tree by explicit assignment to $_ or temporarily modify the subject of transformation through YATL's "on" construct. The "on" construct modifies the subject of transformation for the duration of the associated compound scope. The language term scope means the logical range of a program construct. The variable entry in the symbol table is updated at termination of the scope. An exemplary code excerpt for accessing the current tree is shown in Table 3.

TABLE 3

Exemplary code excerpt for accessing the current tree

```
rule main
{
  on-file "*.*" {
    /* current tree is the term for the whole file */
    $result = check-file($_);
    /* temporarily use result tree */
    on $result {
      if (match (Id:)) { print "Yes"; }
      else { print "No"; }
    }
    /* tree is back to original file tree */
  }
}
```

3.2 Pass-By-Reference

Figure 6A:
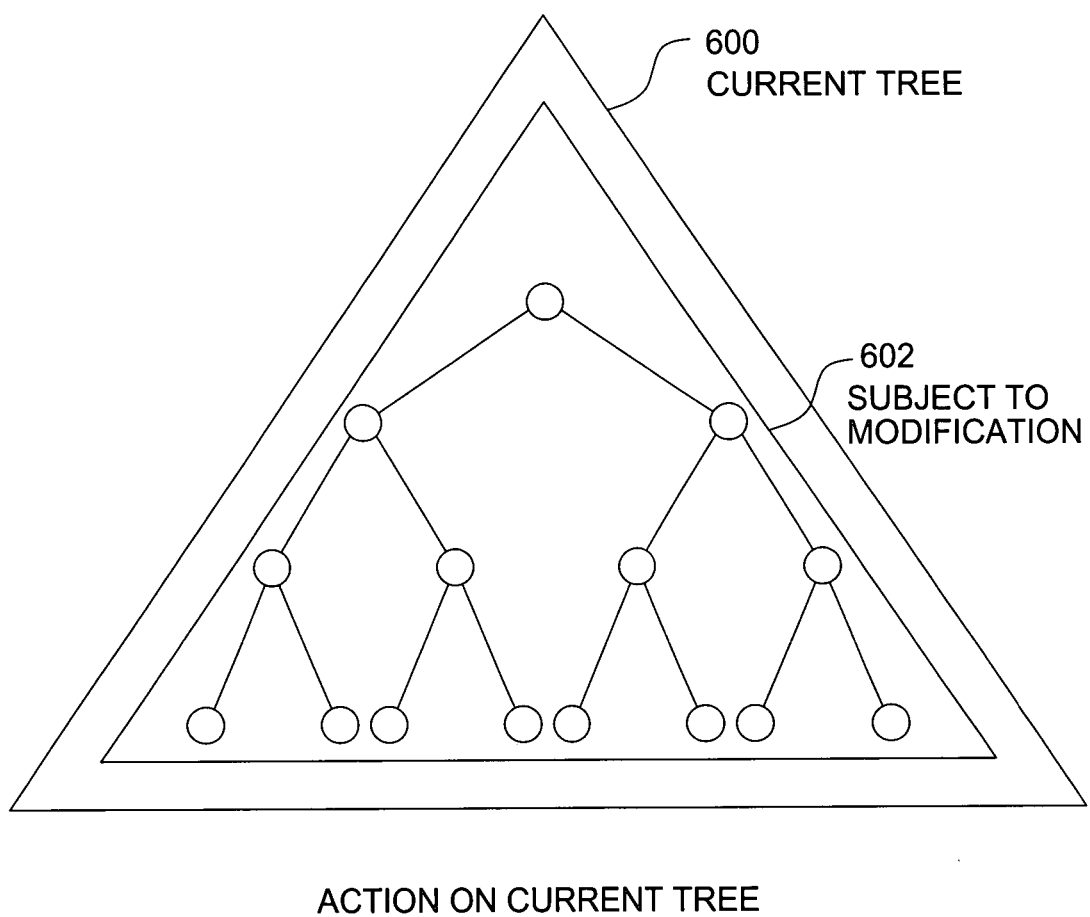
Figure 6B:
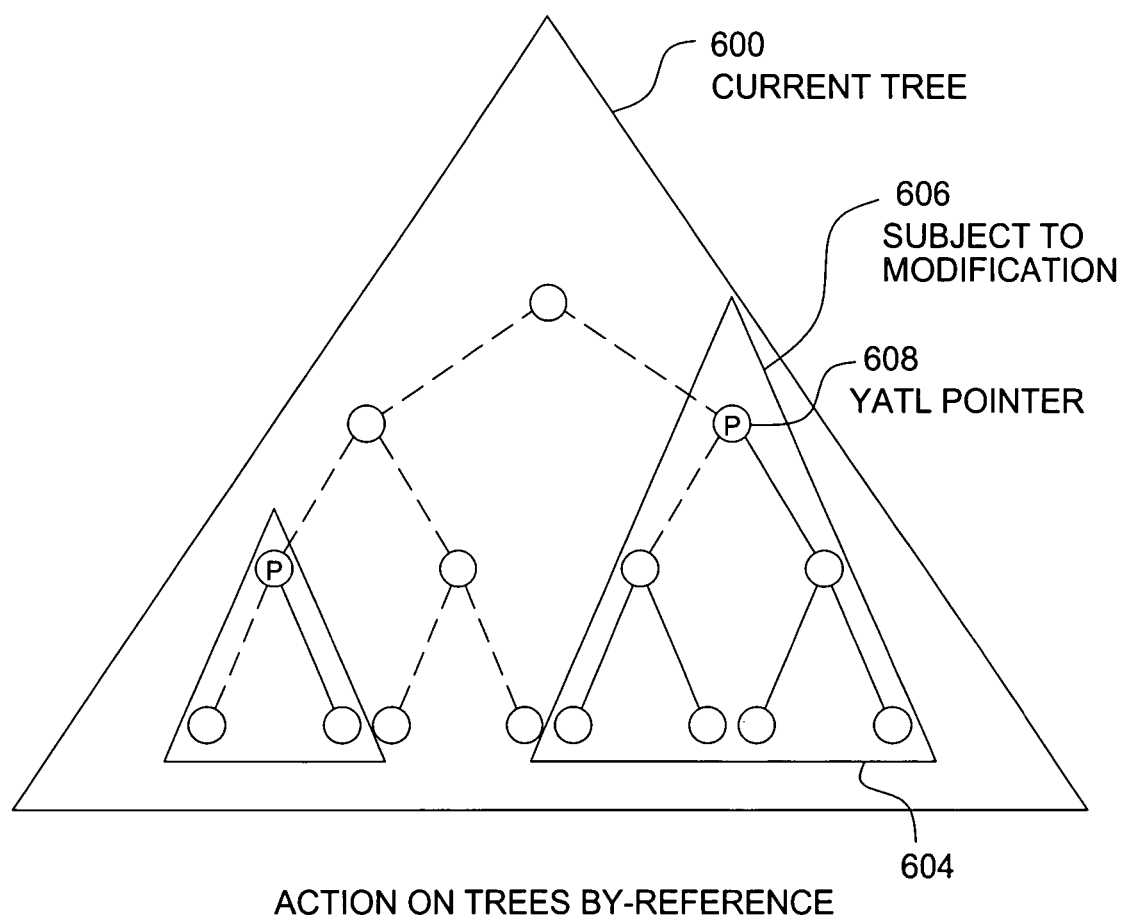
FIG. 6B illustrates an action on a subtree of the current tree by reference.

FIG. 6A illustrates an action directly on a current tree, while FIG. 6B illustrates an action on a subtree of the current tree by reference. In FIG. 6A, the current tree 600 is the subject of modification 602, while in FIG. 6B, a subtree 604 referenced by a YATL pointer 606 is the subject of modification 608.

FIG. 6A illustrates the basic form of modification, where a statement in this exemplary embodiment of YATL modifies the whole current tree 600. Table 4 illustrates a statement modifying the whole current tree 600.

TABLE 4

Exemplary code excerpt for modifying a whole current tree 600

```
match (Id:{'x}) {
}
/* matches the whole current tree against a tree formed by the Id
super-type */
```

Alternatively FIG. 6B illustrates modification by reference this exemplary embodiment of YATL through the on primitive, which allows making reference to one or more subtrees 604 within the current tree, as marked by a YATL pointer 606. Table 5 illustrates statements executed on each subtree marked by pointer p.

TABLE 5

Exemplary code excerpt for executing statements on subtrees 504 marked by pointers 606.

```
on *p {
  match(ID:{'x}) {
  }
}
/* performs the match on the two subtrees within the current tree that are
marked by pointer p */
```

In this exemplary embodiment, when data is assigned to a YATL variable, a copy of the right-hand side tree is made. Replication of trees in this way is made efficient through the ATerm maximal sharing mechanism. This mechanism minimizes memory footprint by careful reuse of subtrees and a copy-on-modification scheme. As a result, the overhead of pass-by-value is not a concern to the YATL programmer.

An alternative method of data passing in this exemplary embodiment is pass-by-reference. This is facilitated by YATL pointers, which are prefixed with *. Pointers are implemented as annotations on the tree, which can be used to locate a given subtree at a later point in time.

In this exemplary embodiment, there are two types of YATL pointers: local and global. Local pointers are unique, i.e., the annotation is different for each assignment. De-referencing local pointers always results in zero or one iterations. Global pointers are prefixed with *:: and use the exact same annotation for each assignment. De-referencing a global pointer results in zero or more iterations. The global pointer is useful for marking a series of constructs of interest and, then, performing some action on all of them.

The "on" construct is also used to change the subject f transformation to that pointed to by the given pointer. However, when pointer arguments are used with the "on" construct, the primitive is implemented as a traversal on the current tree, matching on the respective pointer annotation. Hence, the current tree must contain the annotated subtree for the de-reference to be successful. An exemplary code excerpt for setting a pointer to the current tree is shown in Table 6.

TABLE 6

Exemplary code excerpt for setting a pointer to the current tree

```
*p = $_;    /* set a pointer to the current tree */
...
on *p {
  print "Found tree again $_\n";
}
```

In this exemplary embodiment, variables in YATL cannot be explicitly deleted. The ATerm garbage collection system frees any unused memory. However, pointer annotations can be deletable through an explicit application of the rule clearptr that traverse the tree and removes the appropriate annotations. An exemplary code excerpt for applying the rule clearptr is shown in Table 7.

TABLE 7

Exemplary code excerpt for applying the rule clearptr

```
apply clearptr(*::p); /* clears *::p from current tree */
```

3.3 Variable Interpolation

In this exemplary embodiment, YATL variables can be directly used within strings, like PERL. If the variable is not assigned, then the replaced text will be empty. To protect a "$" from interpolation, a "\" is prepended. An exemplary code excerpt for this protection is shown in Table 8.

TABLE 8

Exemplary code excerpt for protecting "$" from interpolation

```
print "The value of \$v = $v\n";
```

However, variable interpolation does come at a cost, because the string is actually assembled at runtime. Therefore, some embodiments avoid interpolation for constant strings. For example, the following exemplary code excerpt shown in Table 9 is not ideal.

TABLE 9

Exemplary code excerpt for constant string interpolation

```
$version = 1.0;
$header = "Proteus Version $version";
```

3.4 Tuple Construction and Deconstruction

In this exemplary embodiment, YATL variables are implemented as ATerm trees. Trees are put together to form a tuple. Given three individual trees, A, B and C, a single tuple term (A,B,C) is constructed. The reverse process is deconstruction, which splits a tuple into its constituents. Tuple deconstruction fails if the arity is incorrect. In this exemplary embodiment, the YATL syntax for tuple construction and deconstruction is shown in the following exemplary code excerpt in Table 10. Construction and deconstruction is useful for returning data from functions that, by design, only return a single term value.

TABLE 10

Exemplary code excerpt for tuple construction and deconstruction

```
$mytuple = @ (0,1,$v);          /* construction */
? ($zero,$one,$v) = $mytuple;   /* deconstruction */
```

3.5 Integer Handling

In this exemplary embodiment, YATL support basic integer arithmetic. A summary of the supported operators in this exemplary embodiment is shown in Table 11. Other embodiments support various other classes and operators and have varying orders of precedence.

TABLE 11

Basic Integer Handling

| Class | Operators (in order of precedence) |
|---|---|
| Arithmetic expressions | ( ), %, *, |, +, − |
| Conditional expressions | <, >, <=, >=, !=, == |
| Logical expressions | &&, \|\|, ! |
| Postfix operators | ++, −− |

4 Rules And Functions

In this exemplary embodiment, YATL programs are modularized through the use of rules and functions. Rules are defined by the keyword 'tifamily rule' and functions are defined by the keyword 'tamily sub'. Rules can be thought of as syntactic sugar for functions that take the current tree as a parameter and assign the result to the current tree. Rules are called through the apply primitive. They differ from functions in that they inherently act upon the current tree, e.g., invisibly passed as the first parameter. The main rule serves as the entry point to the transformation.

In this exemplary embodiment, calls to functions may also include the current tree, but this must be explicitly passed as a parameter. Furthermore, functions have no effect on the current tree unless the result of the call is explicitly assigned to the current tree variable $_. The following code excerpt in Table 12 illustrates the use of rules and functions to modify the current tree.

TABLE 12

Exemplary code excerpt for using rules and functions to modify the current tree

```
rule main($v)
{
  apply myTransform1($v);    /* these are equivalent */
  $_ = myTransform2($_,$v);
}
rule myTransform1($p)
{
  if (match-once(String:{$p})) { $_ = "bye"; }
```

TABLE 12-continued

Exemplary code excerpt for using rules and functions to modify the current tree

```
}
sub myTransform2($prog, $p)
{
   $_ = $prog;      /* explicitly make a parameter the current term */
   if (match-once(String:{$p})) { $p})) { $_ = "bye"; }
}
```

In this exemplary embodiment, both rules and functions support parameters. Parameters specified on the main rule correspond to command line parameters. For instance, in the above excerpt in Table 12, the main rule parameter $v corresponds to a command line parameter −v<s>, where string s is assigned to the variable $v.

4.1 High-Order Rules and Functions

In this exemplary embodiment, rules and functions can also be passed as parameters to other rules and functions. The prefixes sub:: and rule:: are used to disambiguate an identifier (rule is assumed by default). Of course, conventional parameters (variables and pointers) can be passed in addition to functions and rules. An example is shown in the code excerpt in Table 13.

TABLE 13

Exemplary code excerpt for rules and functions

```
rule main
{
   callme(sub::hello);
}
sub callme(sub::instruction)
{
   instruction( );      /* make a call to the passed function */
}
sub hello
{
   print "Hello there\n";
}
```

5 Flow Control

5.1 Execution Failure

Many programming languages support controlled failure (typically called exceptions). These program failures are from a logical point of view in that the program and/or machine did not actually fail; they are simply a means of handling unexpected events.

In this exemplary embodiment, all statements in YATL, including function calls and rule applications, can fail. Failure is caused either by an explicit fail statement or through a failing primitive (e.g., match-once). Failures can be trapped through the try/catch, either/or and else constructs. Table 14 shows an exemplary code excerpt illustrating catching failures.

TABLE 14

Exemplary code excerpt for catching failures

```
rule main
{
   /* three ways to catch failure */
   try {      apply X;                  }      /* method 1 */
   catch {    error("Rule X failed");   }
   apply X;                                    /* method 2 */
   else error("Rule X failed");
```

TABLE 14-continued

Exemplary code excerpt for catching failures

```
   either (   apply X;                  )      /* method 3 */
   or {       error("Rule X failed");   }
}
```

In this exemplary embodiment, failures are also propagated until they are caught. The following exemplary code excerpt in Table 15 shows how failure is propagated outwards through nested scopes and also across applied rules.

TABLE 15

Exemplary code excerpt for propagating failure

```
rule main
{
   try {
      apply foo;
   }
   catch {
      will_execute( );
   }
}
rule foo
{
   try {
      if (true) {
         fail;      /* explicit fail */
         will_not_execute( );
      }
      will_not_execute( );
   }
   catch {
      will_execute( );
   }
}
```

However, the loop primitives while and for will not fail, because the semantics are to loop while the condition exists, irrespective of the state of the action, as shown in Table 16.

TABLE 16

Exemplary code excerpt illustrating loops and failure

```
rule main
{
   while(true) {
      will_execute( );
      fail;
      will_never_execute( );
   }
   will_execute( );
}
```

For clarity, the keyword continue in the exemplary embodiment of YATL can be used to continue execution without action. This primitive should not be confused with the C continue primitive, which breaks the current execution path and moves to the next iteration of the loop.

5.2 Traversals

Because YATL data is realized as ATerm trees in this exemplary embodiment, constructs that provide tree traversals and manipulation of subtrees are useful.

5.2.1 Matching and Traversal Primitives

Source code transformation languages need the ability to match upon elements of programs (i.e., trees) by traversed repetitive testing. In this exemplary embodiment of YATL, tree equality can be tested through the eq operator or through the using/match operators. Integer trees can also be tested with the simple conditional operator ==. Tables 17 and 18 illustrate different variations on the same semantics for traversal constructs.

TABLE 17

Exemplary Traversal Constructs

| Construct | Traversal | Fails |
|---|---|---|
| match | Direct match without traversal | Yes |
| foreach-match | Top-down left-to-right continual | No |
| foreach-match-rl | Top-down right-to-left continual | No |
| match-once | Top-down left-to-right until action succeeds on matched tree | Yes |
| match-once-rl | Top-down right-to-left until action succeeds on matched tree | Yes |
| foreach-match-bottomup | Bottom-up left-to-right continual | No |
| match-once bottomup | Bottom-up left-to-right until action succeeds on matched tree | yes |

TABLE 18

Exemplary cod excerpt for matching and traversal.

```
$x = 1;
$y = 1;
if (eq($x,$y)) { print "X is the same as Y"; }
/* the using primitive indicates that the subject of the match is $x */
if (using $x match($y)) { print "X is the same as Y"; }
if ($x == $y) { print "X is the same as Y"; }
```

In this exemplary embodiment, the match primitive is designed to be used with super-types. It assumes a match against the current term, unless the "using" construct is used to explicitly specify the subject of comparison.

This exemplary embodiment of YATL also provides a number of basic traversal primitives as shown in Table 17. These traversals fulfill most of the transformation program needs. In line with the semantics of this exemplary embodiment of YATL's basic looping constructs, continual traversal (e.g., foreach-match) will not fail, while once traversals (e.g., match-once) will fail, if a match is unsuccessful.

Other embodiments include more complex traversals, but these basic traversals are sufficient for many transformation applications.

5.2.2 Super-Types

In this exemplary embodiment of YATL, the underlying trees are manipulated by YATL meta-programs. The underlying trees are inherently complicated, due to the complexity of the target language grammar (e.g., C/C++) and the augmentation of the basic AST with literal and layout information (e.g., commenting, white space). YATL super-types provide the abstraction over this detail. Super-types are orthogonal to the core YATL language and implemented as a plug-in compiler personality, in this exemplary embodiment.

Each super-type supports parameters that are used to define concrete values that must hold for a match to succeed. The parameters as also used to make copies into variables and to bind pointers to elements of the matched tree. The basic syntax for super-type matching is shown in Table 19 and an example is shown in Table 20.

TABLE 19

Exemplary syntax for super-type matching

```
<match-construct>(<super-type>) {
    <actions>
}
```

TABLE 20

Exemplary code excerpt for super-type matching

```
match (FunctionCall:{'foo'}<function_name>,{0}<...>) {
}
```

In Table 20, the example matching super-type will match on all calls to a function named foo with exactly one parameter that is a decimal literal zero. The generated Stratego matching strategy, which is congruent, is given in table 21.

TABLE 21

Exemplary Stratego matching strategy

```
FunCall(apply-rightmost(?Id("foo")),?_,?_,?_,
    [(?DecimalLit("0",_,_))|?_],?_,?_)
```

The generated Stratego is less intuitive for a user of imperative languages to understand. Furthermore, this exemplary embodiment of YATL is able to abstract upon the complexity of the hybrid AST that contains augmented layout information. The generated Stratego code must specify actions for all nodes in the subject tree. ?_ is effectively a matching wildcard on the layout nodes.

YATL variables can be used to define concrete values for super-types, in this exemplary embodiment. Furthermore, subtrees of a given match can be bound to YATL variables or marked with a YATL pointer. The exemplary code excerpt in Table 22 de-references the variable $f as a concrete value for the function name, while making a copy of the parameter subtree into variable $p and setting a pointer *q to the same subtree in the original tree.

TABLE 22

Exemplary code excerpt for using variables to define concrete values for super-types

```
match(FunctionCall:($f)<function_name>,{=$p,=*q}<...>) {
}
```

5.3 Loops and Branching

This exemplary embodiment of YATL also provides support for basic loops and branching. In all of these primitives, the associated compound statement must be encapsulated with { and} (no potential for dangling else). Table 23 summarizes the loop and branching constructs in this exemplary embodiment of YATL.

TABLE 23

Exemplary Loop and Branching Constructs

| Construct | Description |
|---|---|
| else | Single statement failure handling |
| if/elsif/else | Condition branching |
| either/or | Sequentional test branching |
| for/while | Pre-conditional looping |
| do/while | Post-conditional looping |

6 Code Construction and Replacement

As well as performing identification of program elements, transformations typically replace existing code with new code, in this exemplary embodiment. This requires the ability to construct new program elements. This exemplary embodiment of YATL supports program construction through build super-types. There are two classes of build super-types: concrete and free-text. Concrete super-types use a predefined free template together with a number of concrete values (literal or variable) to form the respective tree. The syntax is the same as that when super-types are used for matching.

Build super-types are used with the new construct. This is the basic primitive for creating new trees. For example, the following excerpt in Table 24 illustrates the construction of a function call using the FunctionCall super-type.

TABLE 24

Exemplary code excerpt for construction of a function call

```
$p = 0;
$newfc = new (FunctionCall:{'foo'},{"hello"<:str>},{$p};
/* generates function call */
foo("hello",0);
```

Concrete super-types are useful for building smaller elements of code, but become cumbersome when constructing larger program fragments. Free-text super-types provide a mechanism for building such elements in this exemplary embodiment of YATL. Free-text super-types allow the YATL programmer to use an excerpt of code (i.e., by example) to construct a new program tree. Free-text super-types can also be embedded with YATL variables that will be later interpolated. There are three free-text super-types for this exemplary embodiment of YATL: FreeStatement, FreeExpression and FreeCompound. The program excerpt passed to these super-types must conform to the target language grammar for a statement, expression and compound statement, respectively. Table 25 illustrates with the following code excerpt.

TABLE 25

Exemplary code excerpt illustrating free-text super-types

```
$x = new (FreeStatement : {"if (x>$p) exit (0);"});
$y = new (FreeExpression : {"(x > $p)"});
$z = new (FreeCompound : {"{ if (x>$p) exit(0); }"});
```

When free-text super-types are used with multi-line programs, the left-hand margin is marked with a colon. This is used as the reference point for intelligent indentation performed by the system during the insertion process, as shown in Table 26.

TABLE 26

Exemplary code excerpt for multi-line programs

```
$p = 0;
$z = new (FreeStatement : {":if (x>$p)
                           : exit(0);"});
/* create the program */
if (x>0)
  exit(0);
```

6.1 Insertion, Deletion and Replacement

This exemplary embodiment of YATL provides a number of constructs for adding and removing subtrees (i.e., program elements) in the target code. Deletion and insertion is done with reference (at, before or after) to a previously established pointer. The following exemplary code excerpt in Table 27 illustrates the use of statement insertion and deletion.

TABLE 27

Exemplary code excerpt for insertion and deletion

```
/* delete last statement assigned to p */
delete-statement at *p;
/* delete all statements assigned to q */
delete-statement at *::q;
/* insert statement w.r.t. pointers p and q */
insert-statement new (FreeStatement : { "exit(0);"}) after *p;
insert-statement new (FreeStatement : { "exit(0);"}) before *q;
insert-statement $z before *::q;
```

In this exemplary embodiment of YATL, the insert-statement and delete-statement primitives depend upon the given pointers marking a valid statement, as opposed to a subtree within a statement, which was a common mistake for developers learning YATL. If the pointer parameter cannot be located at the appropriate level of subtree, then the insertion/deletion will be successful and, furthermore, no failure will occur.

Subtrees can also be rewritten through explicit assignment, as shown in Table 28.

TABLE 28

Exemplary code excerpt for explicit assignment of subtrees

```
match-once (TypeSpec : {'ULONG}) {
    $_ = new (TypeSpec : {'unsigned}, {'long});
}
```

However, replacement by assignment has to be done carefully to ensure that the new tree is the same form as the tree being replaced, in this exemplary embodiment. If not, a malformed tree will result. Malformed trees may appear to be correct from the built output, but they may nevertheless cause problems (through misinterpretation) in a later stage of transformation.

TABLE 29

Exemplary code excerpt for malformed trees

```
match-once (FunctionCall : {'foo}) {
/* DANGER : mal-formed tree will result */
    $_ = new (FreeStatement : {"goo( );"});
}
/* correct form */
foreach-match (ExprStatement :) {
```

TABLE 29-continued

Exemplary code excerpt for malformed trees

```
if ($first==1 && match-once(FunctionCall : {'foo'})) {
    /* replace current expression statement with a new statement */
    $_ = new (FreeStatement : {"goo( );"});
  }
}
```

6.1.1 Replace-with Construct

In this exemplary embodiment of YATL, replacement through explicit assignment is often desirable, because replacement through explicit assignment allows modification with respect to the current tree as opposed to a pointer reference. YATL also supports a primitive called replace-with that allows a single statement as the current tree to be replaced by one or more new statements. Table 30 shows an example.

TABLE 30

Exemplary code excerpt for replace-with

```
foreach-match (Statement:) {
    if (match-once(FunctionCall:{'foo'})) { /* statement contains foo */
        /* current tree is a statement tree */
        replace-with new (FreeStatement:{":lock( );
                                         : $_
                                         : unlock( );"});
    }
}
```

The replace-with construct is implemented through a technique known as term mutation. The basic idea is that a single term is temporarily replaced by another single term of the form Mutant (I) where I is a list of new terms that will ultimately replace the Mutant term. The replacement is actually performed when the outer context is made available to the transformation engine.

7 Access to the YATL Run-Time

This exemplary embodiment of YATL includes a run-time. The YATL run-time provides auxiliary support for transformations. This includes logic specific to the target language (e.g., scoping rules, symbol tables) as well as access to the underlying operating system services (e.g., file I/O).

7.1 Native Constructs

In this exemplary embodiment, the YATL programmer may need to implement part of a transformation directly in the underlying Stratego language, in some cases. This is facilitated through native constructs. Single statements are defined with the native keyword, while complete rules and functions are defined by encapsulating the native code in %{ and %}. Table 31 is an exemplary code excerpt illustrating native constructs.

TABLE 31

Exemplary code excerpt for native constructs

```
rule main( )
{
    native "test(map(?Id(_)))";
    nativeFunc($_);
}
%{
    nativeFunc = ?t ; <printnl>(stderr, ["Term=",t])
%}
```

In this exemplary embodiment, native functions can also be used to call C-implemented functions via the Stratego prim construct. This provides great flexibility in implementing custom functionality. Table 32 illustrates using native functions to call C-implemented functions.

TABLE 32

Exemplary code excerpt for using native functions to call C-implemented functions

```
rule main( )
{
    checkFileChksum("myFile",$sum);
}
%{
    CheckFileChksum = ?(t1,t2) ; prim("_checkFileChksum",t1,t2)
%}
// filechk.c
//
ATerm _checkFileChksum(ATerm t1, ATerm t2) {
    ...
}
```

In this exemplary embodiment, native Stratego can also be used to directly implement custom super-types. The Native super-type takes a single string parameter that defines the Stratego code for the strategy executed during each iteration of the traversal. Table 33 illustrates custom super-types.

TABLE 33

Exemplary code excerpt for custom super-types

```
foreach-match(Native:{not(oncetd(?Id(_)))}) {
    debug;
}
/* compiles to the following Stratego code */
traverse-topdown(not(oncetd(?Id(_)))) ; debug)
```

In this exemplary embodiment, it is possible to bind YATL variables and pointers to subtrees, using the Native super-type. To do so, appropriate calls to add-yatl-symbol are made so that the variables are added to YATL's rule-function symbol table.

7.2 System Libraries

In this exemplary embodiment, there is a library support that provides access to the underlying operating system. The YATL run-time leverages existing Stratego system libraries in addition to some custom built libraries that are written in C. Other embodiments include other and different libraries. The suite of libraries in this exemplary embodiment includes support for file I/O, console I/O, network I/O, date/time, program execution (e.g., exec), basic string handling (e.g., strcmp) and data structure handling (e.g., list, table). Table 34 illustrates the loading of a YATL list from a file and then printing out each element to the console.

TABLE 34

Exemplary code excerpt for loading a YATL list from a file and printing out each element to the console

```
rule main
{
    try {
        $fin = fopen("mylist.txt", "r");
    }
    catch {
        print "Error: unable to open file\n";
        exit(0);
    }
```

TABLE 34-continued

Exemplary code excerpt for loading a YATL list from a file and printing out each element to the console

```
$list = | [ ] | ;
while($line = fgets($fin)) {
    $list.append($line);
}
print "Dumping...\n";
on $list {
    foreach-element {
        print "List:$__\n";
    }
}
}
```

7.3 Target Language Symbol Tables

A symbol table is a data structure used to record identifiers used in the source program and collect information about various attributes of each. From the perspective of a program transformation system, the symbol table effectively provides a cached representation of information that can be directly derived from the source tree.

In this exemplary embodiment, the target symbol table (i.e., hldig symbols from the target language as opposed to YATL variables) is implemented as a Stratego hash table. Other embodiments implement the symbol table differently. A key element of the symbol table for C and C++ is the scope to which each symbol belongs. In this exemplary embodiment, each new scope in the complete AST is associated with a unique scope identifier. Other embodiments may be modified according to various other language characteristics.

Figure 5:
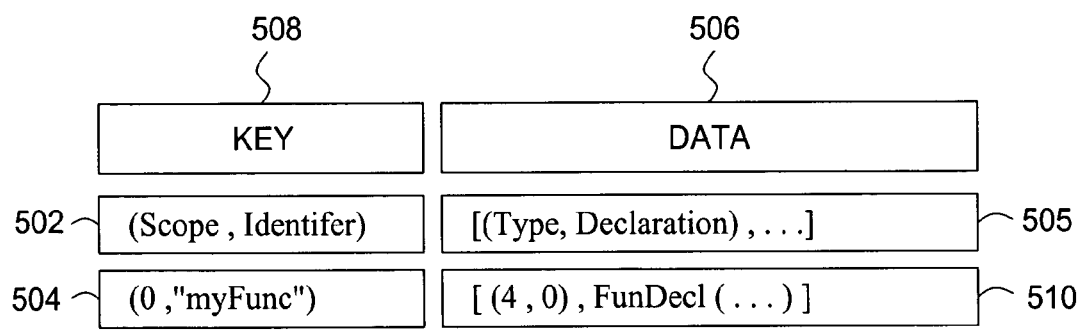
FIG. 5 shows a symbol table structure for a target language for an exemplary embodiment, such as C/C++.

FIG. 5 shows a symbol table structure for a target language for an exemplary embodiment, such as C/C++. Keys 500 in the symbol table include (scope, identifier) 502 and (symbol, identifier) 504 pairs. Data 506 is a list of (type, declaration) 508, 510 pairs. Data 506 is implemented as a list so that C++ overloading can be supported where an identifier may not be unique in a given scope. The current application programming interfaces (APIs) were designed for C and, therefore, only a single (scope, declaration) 508, 510 pair is returned for a given lookup (e.g., the first declared). Other embodiments may implement keys and data differently. In one embodiment, these APIs can be used for C++ symbols, where (scope, identifier) pairs are not necessarily unique (e.g., function overloading).

In this exemplary embodiment, access to the target symbol table is provided through a number of APIs that allow table lookups and synchronized modifications between table and tree. The basic symbol lookup functions are symbol-lookup-xxx, where xxx is one of the suffixes, such as those listed in Table 35.

TABLE 35

Exemplary list of suffixes for symbol lookup functions

| | |
|---|---|
| agnostic | lookup an identifier irrespective of type. |
| typedecl | lookup an identifier for a type (do not resolve). |
| typedecl-deep | lookup an identifier for a type (fully resolve). |
| vardecl | lookup an identifier for a variable/parameter. |
| fundecl | lookup an identifier for a function declaration. |
| method | lookup an identifier for a C++ class/struct method. |

In this exemplary embodiment, each of the above APIs takes a (scope, identifier) pair and returns a (scope, declaration) pair, except typedecl-deep, which takes an additional start scope. The C and C++ scoping rules are used to perform a series of symbol lookups, until a result is found. If a given identifier is not found, even in the global scope, then the lookup API fails. Table 36 illustrates a symbol lookup function.

TABLE 36

Exemplary code excerpt for symbol lookup functions

```
try {
    ? ($s,$decl) = symbol-lookup-agnostic(current-scope( ), "main");
}
catch {
    print "Symbol for main not found!\n";
}
```

In this exemplary embodiment, the symbol table can also be used as a reference for identifier rewriting. The rewrite APIs are implemented as rules. Other embodiments implement them differently. Each takes a scope, identifier pair, and a rule that is applied to the associated declaration. Modifications on the declaration are synchronized between both the symbol table and the corresponding subtree. Table 35 illustrates the use of the symbol rewrite API.

TABLE 37

Exemplary code excerpt for using the symbol rewrite API

```
rule main
{
    ...
    try {
        apply symbol-rewrite-vardecl(rule::make-long,$s,"myVar");
    }
    catch { }
}
rule make-long
{
    match-once(TypeSpec:) {
        $__ = new (TypeSpec:{'long'});
    }
}
```

It is quite common for the symbol table to become out of synchronization with the transformed ATerm tree. To re-synchronize, the rule RebuildSymbols can be applied to a given subtree. This rule flushes the existing symbols, re-annotates the tree with new scope identifiers, and populates the symbol table with new symbols for the respective tree.

8 Example

An example transformation rewrites code so that it conforms to a Hungarian-like variable naming convention. This convention derives a prefix from the variable type that is prepended to the variable name. Thus, given a variable name, the data type is inherently deducible.

In this example, a YATL function, GetHungarianPrefix, was implemented that generated a Hungarian prefix from a given type specification as shown in Table 38. This program sequentially matched on the type, which was passed as a parameter, using an either/or construct. Of course, a table could have been used to store the mappings, but this is a simple example. Note that in matching the type specifications, the LooseTypeSpec super-type was used. The LooseTypeSpec super-type ignores declaration sequencing and the inclusion of any type qualifiers (e.g., static, const).

Given the main prefix generation function, the basic algorithm is defined in Table 39. This algorithm was kept simple for brevity. A practical tool would likely be more comprehensive.

TABLE 38

Transformation Program Example

```
1   /*********************************************************
2   ** GetHungarianPrefix                                    **
3
4   ** Input : a type specification                          **
5   ** Output : a Hungarian prefix                           **
6   *********************************************************/
7
8   sub GetHungarianPrefix($type)
9   {
10     $_ = $type;
11
12     either {
13       $tsn = typespec-node($_) ;     // extract the TypeSpec subtree so that
14                                      // the Class super-tree can be used
15       if (using $tsn match(Class:)) {
16         $prefix = "cls";
17       }
18       else {
19         fail; /* fail onto next "or" action */
20       }
21     }
22     or { match(LooseTypeSpec : {'unsigned},{'long});
23           $prefix = "ul";
24     }
25     or { match(LooseTypeSpec : {'unsigned});
26           $prefix = "ui";
27     }
28     or { match(LooseTypeSpec : {'signed});
29           $prefix = "i";
30     }
31     or { match(LooseTypeSpec : {'unsigned},{'int});
32           $prefix = "ui";
33     }
34     or { match(LooseTypeSpec : {'int});
35           $prefix = "i";
36     }
37     or { match(LooseTypeSpec : {'long});
38           $prefix = "l";
39     }
40     or { match(LooseTypeSpec : {'void});
41           $prefix = "v;"
42     }
43     or { match(LooseTypeSpec : {'bool});
44           $prefix = "b";
45     }
46     or { match(LooseTypeSpec : {'unsigned},{'char});
47           $prefix = "uch";
48     }
49     or { match(LooseTypeSpec : {'char});
50           $prefix = "ch";
51     }
52     or { $prefix = ""; }
53
54     return $prefix
55   }
```

TABLE 39

Exemplary algorithm for main prefix generation function

1. Find each variable declaration.
2. Extract its name and type (fully resolved).
3. Derive the prefix from its type and pointer level.
4. Capitalize the first letter of the variable name.
5. Replace variable identifier with prefixed/capitalized name.

TABLE 40

Exemplary code excerpt for matching variable declarations

```
foreach-match(VarDecl : {=*d}<decl>,{=$t}<type>) {
  on *d {
    ... modify declaration ...
  }
}
```

In this example, variable declarations were matched through the VarDecl super-type. Using this, a YATL variable/pointer was bound to the declared type and the list of variable identifiers. In order to modify the variable identifiers in place, without reconstructing the rest of the declaration, a pointer was used as shown in Table 40. Otherwise, a copy would have been modified without effect.

Given the type from the declaration, the type was resolved through possible type definitions by using the symbol-lookup-typedecl-deep call. (See line 21 of Table 38.) This API used the symbol table to fully resolve the type from the given scope, because types are scoped. If this call failed, then there was no further resolution of the type and, therefore, the type was treated as a basic type, assuming that all types were available. Storing was also done at the pointer level. For example, given type T defined as typedef unsigned long **T, the type is unsigned long and the pointer level is 1. This pointer level was later added to the level associated with the individual declaration. (See line 37 of Table 38).

The next stage was to build the Hungarian prefix from the fully resolved type using the GetHungarianPrefix function. Iteration through each of the declarators in the declaration list was done and then the identifier was assembled and replaced. Part of the assembly included adding the letter p to the prefix for each pointer level. (See lines 43-45 of Table 38). The name replacement was performed by matching on the Id term and then using explicit assignment on the current term. The complete main rule is shown in Table 41.

TABLE 41

Exemplary program main rule

```
/************************************************************
 hungarian.yatl                                           
                                                          
 Description: example of Hungarian notation transformation 
/************************************************************/
include "debug.ymod"
include "types.ymod"
include "typesays.ymod"
rule main
{
  on-file "*.*" {
    for-each-match(VarDecl : {=*d}<decl>,{=$t}<type>) {
      // dereference the type (through possible typedef statements)
      //
      either {
        ? ($t,$plb) = symbol-lookup-typedecl-deep(current-scope( ),"$t",0);
        $t = crunch-type($t);
      }
      or {
        $plb = 0;
      }
      // build prefix
      //
      $hp = GetHungarianPrefix($t);
      // process each identifier in the declaration list
      //
      on *d {
        foreach-element {
          $tpl = extract-ptrlevel($__) + $plb;
          $prefix="";
          // add one "p" for each pointer level
          //
          for ($i = 0; $i < $tpl; $i++) {
            $prefix = conc-strings("p",$prefix);
          }
          // add Hungarian prefix to original name
          //
          $prefix = conc-strings($prefix,$hp);
          // replace identifier with newly formed name
          //
          match-once(ID:(=$i) {
            $newid = conc__strings($prefix,make-first-letter-uppercase($i));
            $__ = new(Id:($newid));
          }
        }
      }
    }
  }
}
```

8 Programming with YATL 8.1 All Constructs Take a Tree and Return a Tree

All of the constructs in this exemplary embodiment of YATL operate on a given input tree known as the current subject. For convenience, a tree can be thought of as a fragment of program source code. The constructs may or may not modify the subject, but, in any case, another tree results.

8.2 Variables and Data

This exemplary embodiment of YATL is typeless, that is, variables do not have a type. Variables are identified by the $ prefix followed by an identifier. All variables are locally scoped to the rule and, like PERL, variables do not need to be explicitly declared. Variables are initialized when they are first assigned.

8.2.1 Variable Assignment

In this exemplary embodiment, variables can be re-bound at any time and represent a copy of whatever they have been bound to. They are bound through the assignment operator, =, either within super-type matching or an explicit assignment statement. Table 42 illustrates variable assignment.

TABLE 42

Exemplary code excerpt for variable assignment

```
rule main
{
  $t = "Hello";
}
```

TABLE 42-continued

Exemplary code excerpt for variable assignment

```
rule FindType
{
   $t = "Bye"; // does not over-write $t::main
}
```

8.2.2 Current Tree Variables

This exemplary embodiment of YATL has one special variable, $_. $_ Refers to the current tree (e.g., program segment).

8.2.3 Global Variables

In this exemplary embodiment, global variables are scope across rules. A global variable is declared by simply prepending the variable identifier with the :: (double colon) symbol. Table 43 illustrates a global variable. Global variables are not released until the transformation program exists.

TABLE 43

Exemplary code excerpt for global variables

```
$::g = 10; // creates a global variable g and assigns it to 10
```

8.2.4 Marker Variables (a/k/a Pointers)

In this exemplary embodiment, variables make copies of the program they are bound to. Marker variables allow transformations by reference. They behave in a manner akin to conventional pointers. Marker variables are denoted with an asterisk. Table 44 illustrates marker variables.

TABLE 44

Exemplary code excerpt for marker variables.

```
// binds a marker fn to the matched function name element
//
foreach-match (FunctionCall: (=*fn)<function_name> {...}
// bind a marker p to the current program
//
*p = $_;
// bind global marker q to the current program
//
*::q = $_;
```

Markers are either unique or replicated (indicated with ::). Unique markers are changed each time the marker is assigned. Markers are referenced using the "on" construct. The "on" construct applied to a unique marker results in a single application, while the "on" construct applied to a replicated marker repeats for each of the occurrences of the marker.

8.2.5 Stringification

In this exemplary embodiment, one data type is the string. Any LL-AST or subtree can be converted to a string. Stringification is achieved by the concatenation of all strings within the tree from left to right. Table 45 illustrates strings.

TABLE 45

Exemplary code excerpt for strings

```
$v = | Id("x") |;   // variable v now contains tree ID("x")
foo($v);            // passes tree ID("x") to function foo
foo("$v");          // passes string "x" to function foo
$v = "$v";          // converts $v to string "x"
```

8.2.6 Data Unification

In this exemplary embodiment, one or more data items (e.g., trees, strings, integers) can be combined into a single tree using bracketing. This is particularly useful in building return values for functions. Unification equates to building a term given a number of siblings. Table 46 illustrates data unification.

TABLE 46

Exemplary code excerpt for data unification

```
$result = @(0,1,2);      // result contains term (0,1,2)
$p = 20;
$results = @("fail",$p); // results contains a term ("fail",20)
sub foo( )
{
   return @(0,1);
}
sub foo2( )
{
   $r = @(0,$t);
   return $r;            // return unified term (0,$t)
}
```

8.2.7 Split Assignments

In this exemplary embodiment, unified data can be split using a specialized form of assignment. Table 47 illustrates split assignments of the form ?([list_of_variables])=[term expression];. Split assignments may include the current term variable $_. Note that the leftmost use of the $_ in the last example in Table 47 is bound to the current term.

TABLE 47

Exemplary code excerpt for split assignments

```
sub foo( ) { return (0,1,2); }
?($a,$b,$c) = foo( );
// $a=0, $b=1, $c=2
sub foo( ) { return (0,1,2); }
? ($_,$b,$c) = foo( );
// $b=1, $c=2
// current term is 0
? ($_,$b,$_) = (0,1,2);
// current term is 0 as opposed to 2
```

8.3 Rules and Functions

This exemplary embodiment of YATL supports modularization of functionality into subroutines. In YATL, there are two types of subroutines: rules and functions.

8.3.1 Rules

In this exemplary embodiment, rules form the basic unit of transformation on the current subject; that is, they cause effect on the current subject. Rules are identified by a unique identifier and optionally support parameters, except the main rule that does not have parameters. The rule identified by main is the entry point from the transformation execution and must exist in every YATL program. Parameters that are specified on rule main map to command line arguments for the tool. Arguments are supported with (default) or without a value (prefix noarg::). The order of the parameters declared does not matter. The values of the parameter variables, scope to function main, are coudn to the command line values (as a string) or the value 1 where there is no argument. They are used in the same way as any other YATL variables. Table 48 illustrates rules.

TABLE 48

Exemplary code excerpt for rules

```
rule main
{
...
}
rule FindType($P,$Q)
{
   print "Param 1 is $P and Param 2 is $Q\n";
}
rule main($port, $noarg::debug)
{
   if ($port == "0") {...}
}
// the variable $port is the string "0" as opposed to the integer value 0
```

In this exemplary embodiment, rules other than the main rule are called using the apply expression. The result of the apply expression changes the current tree to that which results from the particular rule. Table 49 illustrates applying rules when the apply command is within a foreach-match loop. Using the apply operator in the context apply R1>>R2 means apply rule R2 if and only if R1 succeeds. If a rule is applied without explicitly handling its failure, the whole transformation may stop. The else clause is used to catch exceptions and continue.

TABLE 49

Exemplary code excerpt for applying rules

```
rule main
{
   $result = apply FindType(0,"int");
   $result2 = apply FindRule1 >> FindRule2;
}
rule main
{
   apply FindType(0,"int")
   else print "FindType failed";
   apply FindLong; // this will always execute
}
```

8.3.2 Functions

In this exemplary embodiment, functions differ from rules in that functions do not pass an inherent program tree and on calling functions do not effect the current program tree. Rules are, in fact, syntactic sugar over functions. Functions are defined with the sub keyword and called as illustrated in Table 50.

TABLE 50

Exemplary code excerpt for functions

```
rule main
{
   log1("Hello");
}
// log1 subroutine definition
//
sub log1($r)
{
   print("Event: $r\n");
}
```

8.4 Program Flow
8.4.1 Else

In this exemplary embodiment of YATL, all statements can succeed (i.e., a tree is returned) or fail if failure is not explicitly handled by an else clause, the program stops. Table 51 illustrates handling failure with an else clause.

TABLE 51

Exemplary code excerpt for else clause

```
rule main
{
   apply Broken
   else {
      print "Handle failure";
   }
   apply AlsoBroken
   else print "Handle failure";
}
```

8.4.2 Continue

In this exemplary embodiment, the continue construct continues the program, but is useful when an explicit else action is not desired. Table 52 illustrates the continue construct.

TABLE 52

Exemplary code excerpt for continue

```
rule main
{
   apply CouldFail
   else continue;
   // here is always reached
}
```

8.4.3 Try and Catch

In this exemplary embodiment, statement blocks (including function calls) can be checked for failure through the try clause. The try construct executes the try block and if the block fails, then executes the catch block.

8.4.4 Isolate

In this exemplary embodiment, isolate is used to protect the current tree from being affected, allowing temporary modifications. The isolate construct is used for a single statement or a complete block. Table 53 illustrates the isolate construct.

TABLE 53

Exemplary code excerpt for isolate

```
rule main
{
   isolate apply Something;
   isolate {
      print "Throw away this block";
      apply Something;
   }
}
```

8.4.5 If, Else Statement

In this exemplary embodiment, simple conditional flow is supported through an if statement. Full statement parentheses are used to avoid the dangling else problem. Table 54 illustrates the if, else statement.

TABLE 54

Exemplary code excerpt for if, else statements

```
if (match-once(ID:{'x'})) {
   print "Contains x\n";
}
else {
   print "Does not contain x\n";
}
```

8.4.6 Either or Statement

In this exemplary embodiment, the either or statement is used to execute a number of statement blocks until one succeeds. At least one alternative is provided. Table 55 illustrates the either or statement.

TABLE 55

Exemplary code excerpt for the either or statement

```
either ( f1( ); } or ( f2( ); } or { f3( ); }
```

8.4.7 While Statement

In this exemplary embodiment, while loops are a basic pre-test looping command. The loop action is applied to the current subject and the expression is isolated. Table 56 illustrates the while statement.

TABLE 56

Exemplary code excerpt for the while statement

```
while ($v < 10) { $v++; }
```

8.4.8 Do-While Statement

In this exemplary embodiment, the do-while statement is a variation on the while statement for the post-test looping. Table 57 illustrates the do-while statement.

TABLE 57

Exemplary code excerpt for the do-while statement

```
do {
    $v = $v + 2;
}
while ($v < 10);
```

8.4.9 For Statement

In this exemplary embodiment, the for statement provides syntactic sugar for while loops with initialization, test, and increment. The for statement's action causes effect on the current tree. Unlike C, the condition is required in the for statement. Table 58 illustrates the for statement.

TABLE 58

Exemplary code excerpt for the for statement

```
for ($v=0; $v<10; $v++) {
    print "loop $v\n";
}
```

8.4.10 Die and Exit

In this exemplary embodiment, die prints an error message and exits the program. Table 59 illustrates the die command. The exit statement also exits the program.

TABLE 59

Exemplary code excerpt for die and exit

```
rule main
{
    apply MustNotFail
    else die "It did fail though!\n";
    exit(-1);
}
```

8.4.11 Explicit Failure

In this exemplary embodiment, the fail statement explicitly causes a match or function call to fail. Table 60 illustrates explicit failure.

TABLE 60

Exemplary code excerpt for the fail statement

```
rule main
{
    if (! $v = foovar( )) {
        die "foobar has failed!\n";
    }
}
sub foobar( )
{
    if ($::x > 10) {
        fail;
    }
}
```

8.5 Matching
8.5.1 Foreach-Match

In this exemplary embodiment, foreach-match is the principal construct for recursively searching with the current subject. This construct matches on a given tree (built using a super-type) within the current subject. The semantics of the call are: for each matching tree in the current subject tree, perform the following action on that matching tree. The traversal used for this match is top-down. Table 61 illustrates searching the current subject and for each matching function call to the function atol, applying the rule R2. R2 replaces the call with mynew_atol, transposing the parameters also. Match expressions may be or'ed together to avoid repetition.

TABLE 61

Exemplary code excerpt for foreach-match

```
foreach-match (FunctionCall: {'atol})
{
    apply R2;
}
rule R2:
{
    match-once(List: {=$p});
    new (FunctionCall: {'mynew_atol},{$p});
}
```

8.5.2 Match-Once, Match-Once-Else

In this exemplary embodiment, match-once is used to perform a traversal until a single match within the current subject succeeds. The action is only applied on the first match. If no match is found, the else action is applied to the current subject. Table 62 illustrates the match-once statement.

TABLE 62

Exemplary code excerpt for match-once

```
match-once (FunctionCall:) {
    apply R2; // applies R2 to the first matched FunctionCall
}
match-once (FunctionCall:)
else print "Cannot find function call\n";
match-once (FunctionCall:)
{
    print "Found function call\n";
}
else print "Did not find function call\n";
```

8.5.3 Foreach-Match-Bottomup, Match-Once-Bottomup

In this exemplary embodiment, match-once and match-once else operate in a top-down fashion, while foreach-match-bottomup search ion a bottom-up fashion so that the leaves are processed first. Table 63 illustrates foreach-match-bottomup.

TABLE 63

Exemplary code excerpt for foreach-match-bottomup

```
// given statement a.b.c = 0
foreach-match (FieldRef:) {
   print "field ref $_,";
}
//outputs a.b.c,a.b
foreach-match-bottomup(FieldRef:) {
   print "field ref $_,";
}
//outputs a.b.,a.b.c
```

8.5.4 Match, Match Using

In this exemplary embodiment, the match expression facilitates an exact match. There is no inherent traversal involved. Match is typically used in conjunction with a conditional. Match conditions can also be directed on a given tree by using the "using" construct. Table 64 illustrates match using.

TABLE 64

Exemplary code excerpt for match using

```
if (match(FunctionCall:{'foo})) {
   print "Found foo\n";
}
match(FunctionCall:{'foo}) {
   print "Found foo $_\n";
}
if (using $p match (FunctionCall:{'foo})) {
   print "Found foo in \$p\n";
}
```

8.4.5 Exact Matching Without a Super-Type

In this exemplary embodiment, the developer can match against a piece of code held within a variable or explicitly specified. The parameter to match construct is a term expression that builds a tree. Table 65 illustrates exact matching without a super-type.

TABLE 65

Exemplary code excerpt for exact matching without a super-type

```
foreach-match("x") { } //matches on all strings "x"
foreach-match($v) { } //matches on subtree held in $v
$v = "s";
foreach-match("x$v") { } // matches on string "xs"
foreach-match(new (Id:{'x})) { }    // matches against ID("x") - this
                                    // would not normally be used
```

8.5.6 "On" Statement

In this exemplary embodiment, the "on" statement applies some transformation action to a tree (e.g., program segment) held in a variable, without affecting the current tree. Table 66 illustrates the "on" statement.

TABLE 66

Exemplary code excerpt for the "on" statement

```
on $prog
{
   foreach-match (FunctionCall: {'atol})
   {
      print "Found function: $_\n";
   }
}
// on used to de-reference markers
on *::p { print "transformed program function: $_\n"; }
on *q ( print "Transformed program function: $_\n"; }
```

8.6 Super-Types

In this exemplary embodiment of YATL, super-types are one way to abstract upon the complexity of the target grammar and the LL-ASTs that are produced. The super-types are specific to the target language and implemented as a personality on the YATL compiler. Super-types allow the YATL programmer to both search (match) against segments of program code and also to build new segments of code. Table 67 illustrates a super-type.

TABLE 67

Exemplary code excerpt for a super-type $\_ = new (FunctionCall: {"ntohl"}, {$p});

8.6.1 Super-Type Parameters

In this exemplary embodiment, super-type parameters are standard across all super-types parameters include three different optional elements: criteria, field identifier, and attributes. The criteria define the value or variable to which the field data is bound. The field identifier qualifies the field when it cannot be implied from the parameter ordering. Attributes change search strategies and formations. Table 68 illustrates super-type parameters.

TABLE 68

Exemplary code excerpt for super-type parameters $\_ = new (FunctionCall: {"ntohl",=$fn}<function_name>, {=$p}<all>);
$\_ = new (FunctionCall: {"X"}<param1:str>);

8.6.2 Match Super-Types

In this exemplary embodiment, matching super-types are used by the YATL programmer to locate program segments of interest. A matching super-type is like a template for a piece of code, where each template is of a given form and contains a number of holes (wildcards). These holes are filled in using the constructor parameters. Super-type parameters are dependent upon the implementation of the respective super-type constructor. Parameters are typically a mixture of YATL variables and constants. The parameters are specified as a comma-separated list and their order is meaningful. When YATL variables are used in a super-type constructor, they are used in either reference or assignment. That is, reference (e.g., $x). means use the contents of $x, whereas assignment (e.g., =$x) means that when the super-type matches, the matching value is assigned to variable $x. Table 69 illustrates match super-types.

TABLE 69

Exemplary code excerpt for match super-types

```
// TypeSpec
// Parameters: 0-2
// Semantics: each parameter identifies a member of a composite type
// specification
(TypeSpec: {'unsigned'})        // matches unsigned only,
                                // unsigned x;         MATCH
                                // unsigned long x;    NO MATCH
                                // unsigned x,y,z;     MATCH
(TypeSpec: {'unsigned'}, {=$t}) // matches arity 2, starting with unsigned
                                // unsigned x;         NO MATCH
                                // unsigned long x;    MATCH $t-long
(TypeSpec: )         // match all type specifications
                     // unsigned x;      MACTH
(TypeSpec: {=$t})    // match all type specifications and bind to variable $t
// FunctionCall:
// Parameters: 0 or more
// Semantics: param (1) is the function identifier, param (1) onwards represent function
// call parameters. Each constructor parameter can map to one or more function
// parameters. For example, a variable $p, may have been bound to all of the
// parameters for some other call.
(FunctionCall: {'atoll'})  // FunctionCall super-type
                           // atol("99"); MATCH
(FunctionCall: {=$f})      // atol("99"); MACTH $f=atol
// FunctionBody:
// Parameters: 0 or 1
// Semantics: param (1) is the function identifier
(FunctionBody: {'myfunction'})   // void myfunction(int x) { }     MATCH
                                 // Note: subject match is compound statement
(FunctionBody: )    // MATCHES all function bodies
// Id:
// Parameters: 0 or 1
// Semantics: param (1) is the value of the identifier
(Id: {'x'})      // int x;           MATCHES x
                 // int x,y;         MATCHES x
                 // printf("x");     NO MATCH
(Id: )           // int x,y,z;       MATCHES x, y and z
//Literal:
// Parameters: 0 or 1
// Semantics: param 91) literal content
(Literal: {";"})  // while(x);      MATCHES ';'
(Literal: )       // MATCHES all literals
// Struct:
// Parameters: 0 or 1
// Semantics: param (1) variable identifier
// Notes: if specified, param (1) must be a member of identifier list
(Struct: {'t'})   // MATCHES also struct definitions type id 't
                  // e.g., struct t { ... }
                  // e.g., struct r,s,t { ... }
(Struct: {=$t})   // MATCH all struct definitions bind id to $t
// VarDecl:
// Parameters: 0 or 1
// Semantics: param (1) variable identifier
// Notes: if specified, param (1) must be a member of identifier list
(VarDecl: {'x'})  // int x;          MATCHES
                  // int x,y,z;      MATCHES
(VarDecl: {=$x})  // int y;          MATCH and bind to y
(VarDecl: )       // int a,b;        MATCH
// MemberDecl:
// Parameters: 0 or 1
// Semantics: param (1) member identifier
// Notes: if specified, param 91) must be a member of identifier list
(MemberDecl: {'x'})   // struct X {
                      // int x;   MACTHES
                      // };
```

8.6.3 Build Super-Types

In this exemplary embodiment of YATL, a second family of super-types is that of building, which allows the YATL programmer to construct new fragments of code either from scratch or from existing pieces. Table 70 illustrates build super-types. The FreeStatement super-type build constructors allows the YATL developer to directly write a complete C/C++ statement as part of their transformation program. The FreeExpression super-type build constructor allows the YATL developer to directly write a C/C++ expression as part of their transformation program. The FreeExpression super-type is used in the same way as the FreeStatement super-type.

TABLE 70

Exemplary code excerpt for build super-types

```
// FreeStatement
// Parameters: 1
// Semantics: param (1) free text code
$_ = new (FreeStatement: {"if (x==0) {exit 0; }"});     // O.K.
$_ = new (FreeStatement: {"    :while(x>0) {            // O.K.
                              : pop(x);
                          "});
$_ = new (FreeStatement: {"if (x==0)"});                // will not compile
$_ = new (FreeStatement: {"if ($x ==0)"});              // will not compile
// FreeExpression:
// Parameters: 1
// Semantics: param (1) free text code
$_ = new (FreeExpression: {"(x > 0)"});                 // O.K.
$_ = new (FreeExpression: {"if (x==0)"});               // will not compile
// FunctionCall:
// Parameters: 1 or more
// Semantics: param (1) function identifier, (2) and beyond call parameters
$_ = new (FunctionCall: {'ntohl'},{'x'});               // generates --> ntohl(x)
$_ = new (FunctionCall: {'ntohl'},{$p});                // generates --> ntohl(?);
                                                        // where ? is contents of $p
// generates --> pr(Hello")
//
$_ = new (FunctionCall: {'pr'},{"\"Hello\""});
// also generates -->pr("Hello")
$_ = new (FunctionCall: {'pr'},{"Hello"}<:str>);
// List:
// Parameters: 0 or more
// Semantics: builds a comma-separated list, e.g., a function call parameter list
$_ = new(List: {'1'},{"A"});                            // generates 1,"A"
// Id:
// Parameters: 1
// Semantics: param (1) contents of the identifier
$_ = new (ID: {'x'})                                    // generates x, e.g., part of int x;
// Literal:
// Parameters: 1
// Semantics: param (1) contents of the literal
$_ = new (Literal: {'return'})                          // generates literal return
// Native:
// Parameters: 1
// Semantics: param (1) defines the ATerm for the tree
// Notes: this constructor can be used to build ATerm trees directly
// generate TypeSpec(Long("long"))
$_ = new(Native: ("TypeSpec(Long(\"long\"))|"});
// Type:
// Parameters: 1
// Semantics: a single element in a compile typespec
// Notes: this is useful when replacing a single element in a typespec,
// for example, for unsigned mt or const mt to unsigned short and const short,
// respectively
$_ = new (Type: {'x'})
// TypeSpec:
// Parameters: variable
// Semantics: build the complete typespec
$_ = new(TypeSpec: {'unsigned'}, {'int'})               // generates a new typespec:
                                                        // unsigned mt
// TypeId:
// Parameters: variable
// Semantics: generate an AbstractDecl, which contains a typespec and a
// variable list of pointer operators
$_ = new(TypeId: :'int'}, {'*'})                        // generates AbstractDecl int *
```

TABLE 71

Exemplary code excerpt for new construction

```
rule main
{
    $_ = "Hello";          // will set the current subject to the string
    "Hello"
}
rule main
{
    $newvar = new (FreeStatement: {"int x = 0;"});
}
```

8.7.2 Referenced Statement Insertion

In this exemplary embodiment, a new statement is inserted with reference to a YATL marker, as illustrated in Table 72. Markers used for statement insertion point to a statement or expression statement rather than a subtree of a statement.

TABLE 72

Exemplary code excerpt for reference statement insertion

```
insert-statement new (FreeStatement: {":x = 0;"}) before *p;
insert-statement new (FreeStatement: {":x = 0;"}) after *::p;
insert-statement $ns before *q;
```

8.7.3 Referenced Statement Deletion

In this exemplary embodiment, a statement is deleted by reference, as illustrated in Table 73.

TABLE 73

Exemplary code excerpt for statement deletion

```
delete-statement at *p;
delete-statement at *::q;
```

8.7.4 Statement Replacement

In this exemplary embodiment, it is often useful to replace a statement with a new statement without explicitly setting up marker variables. This is achieved through the replace-with construct, which replaces the current statement with one or more new statements, as illustrated in Table 74. The replacement is not actually performed until the inner-most loop is exited.

TABLE 74

Exemplary code excerpt for statement replacement

```
foreach-match(Statement:{=$s}) {
    foreach-match(FunctionCall: {'foo}) {
        replace-with new (FreeStatement: {":lock( );
                                          : $s
                                          : unlock( );"});
    }
}
```

8.7.5 Layout Insertion

In this exemplary embodiment, pointer references are used to insert layout before or after a given statement, as illustrated in Table 75. Insertion after a statement prepends the given string to the layout. Insertion before a statement appends the given string to the layout.

TABLE 75

Exemplary code excerpt for layout insertion

```
insert-layout "\n/* new function */\n" after *p;
insert-layout "\n/* new function */\n" before *p;
```

8.8 Integer Handling

This exemplary embodiment supports basic integer arithmetic. Arithmetic expression include *, /, +, −, % (multiply, divide, add, subtract, modulo division), ++, −− (increment, decrement), postfix and conditional expression include !=, ==, >, <, >=, <=(not equal, equal, greater than, less than, greater than or equal, less than or equal). Other embodiments support various and different expressions.

8.9 Input/Output (I/O)

Table 76 illustrates I/O in this exemplary embodiment.

TABLE 76

Exemplary code excerpt for input/output

```
print "Current tree is $__\n";
print stdout, "$X found\n";
// standard streams accessed as follows
$fd = stdio-stream( );
$fd = stdout-stream( );
$fd = stderr-stream( );
$fgets = fgets($fd);
fputs("something",$fdout);
```

8.10 Scoping

In this exemplary embodiment, the scoping constructs, transform-uses X where Y and transform-deci X where Y, allow changing the declaration of a variable based on how it is used or vice-versa. In both constructs, the first parameter X is the name for a YATL rule that changes uses/decis. The second parameter Y is a rule that matches the uses of a variable given the name of the variable, which is passed into the rule as a parameter. Table 77 illustrates scoping in the example of match_use is listed below, $p contains the variable name and specifies that a variable that is assigned the return value of function call rn_getseg.

Computer Program Listing Appendix

Computer program listings pertaining to Table 77 are provided in electronic format, as permitted under 37 C.F.R. §1.52 (e) and §1.96(c). The submitted compact disc, the contents of which is herein incorporated by reference, contains the following file: 11222418_wordcode_tables77-79.doc

8.11 Interworking with Stratego

This exemplary embodiment of YATL supports the ability to interface directly into Stratego. This is achieved in one of two ways: using a native statement or a Stratego block. The native statement can be used to call Stratego code directly. This is useful to access more complex Stratego functionality that cannot be expressed directly in YATL. The native statement is also useful for debugging purposes. Table 78 illustrates the native statement. Complete blocks of Stratego can be inserted into the YATL code. The contents of these blocks are directly pasted in their declared position. Native blocks are encapsulated with % { and %}. The native block also allows the YATL programmer to directly interface with C code, using the Stratego primitives construct. If there is no super-type available for a given construct, the native super-type is used. This super-type allows the use of Stratego match expressions directly.

Computer Program Listing Appendix

Computer program listings pertaining to Table 78 are provided in electronic format, as permitted under 37 C.F.R. §1.52 (e) and §1.96(c). The submitted compact disc, the contents of which is herein incorporated by reference, contains the following file: 11222418_wordcode_tables77-79.doc Table 79 contains a grammar for an exemplary embodiment of the YATL language. Those skilled in the art and informed by the teachings herein will realize that the invention encompasses obvious changes in grammar and syntax and instead is directed to the broad concepts implemented by the exemplary grammar, syntax, and constructs.

Computer Program Listing Appendix

Figure 7:
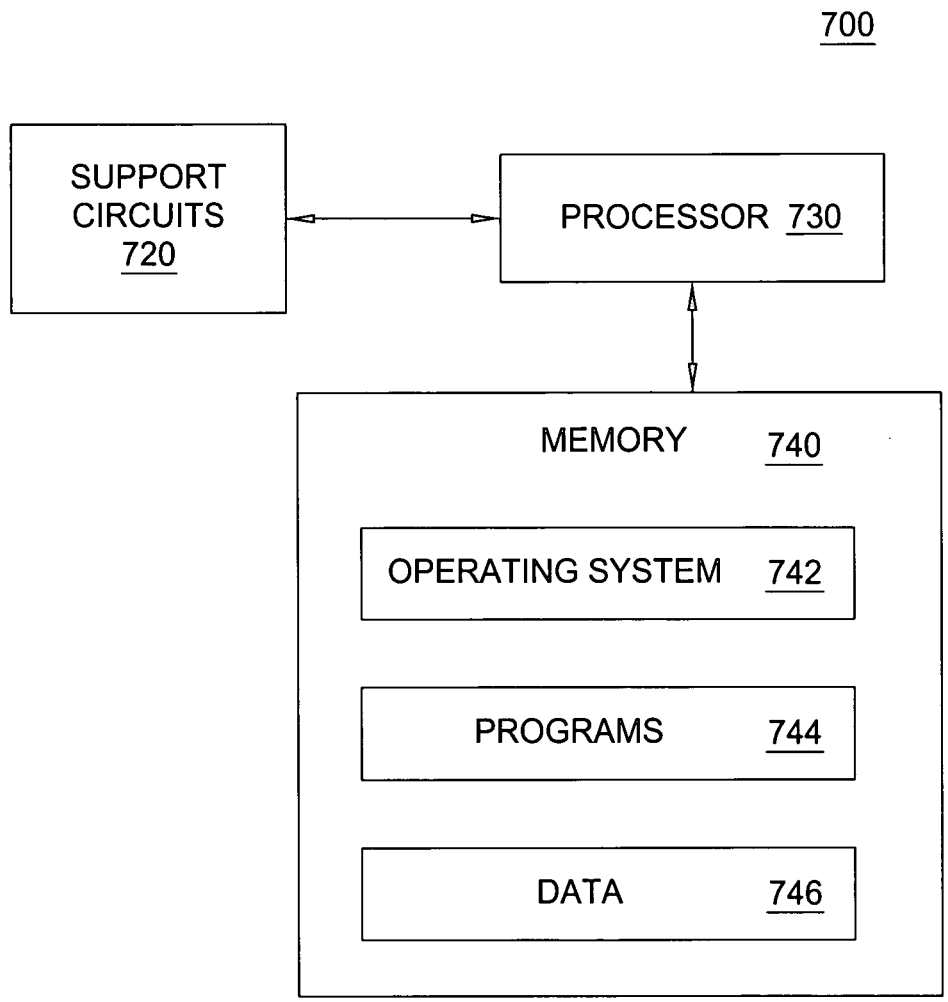
FIG. 7 is a high level block diagram showing a computer. To facilitate understanding, identical reference numerals have been used, where possible, to designate identical elements that are common to the figures.

Computer program listings pertaining to Table 79 are provided in electronic format, as permitted under 37 C.F.R. §1.52 (e) and §1.96(c). The submitted compact disc, the contents of which is herein incorporated by reference, contains the following file: 11222418_wordcode_tables77-79.doc FIG. 7 is a high level block diagram showing a computer. The computer 700 may be employed to implement embodiments of the present invention. The computer 700 comprises a processor 730 as well as memory 740 for storing various programs 744 and data 746. The memory 740 may also store an operating system 742 supporting the programs 744.

The processor 730 cooperates with conventional support circuitry such as power supplies, clock circuits, cache memory and the like as well as circuits that assist in executing the software routines stored in the memory 740. As such, it is contemplated that some of the steps discussed herein as software methods may be implemented within hardware, for example, as circuitry that cooperates with the processor 730 to perform various method steps. The computer 700 also contains input/output (I/O) circuitry that forms an interface between the various functional elements communicating with the computer 700.

Although the computer 700 is depicted as a general purpose computer that is programmed to perform various functions in accordance with the present invention, the invention can be implemented in hardware as, for example, an application specific integrated circuit (ASIC) or field programmable gate array (FPGA). As such, the process steps described herein are intended to be broadly interpreted as being equivalently performed by software, hardware, or a combination thereof.

The present invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, and/or stored within a working memory within a computing device operating according to the instructions.

10 Conclusion

An exemplary embodiment of the YATL program transformation language and some features are described. Other embodiments include additional features. YATL has many advantages. By design, YATL is intuitive for programmers of procedural languages to learn and use. YATL provides powerful support for writing transformations in reference to elements of the target grammar through a compiler personality. YATL is also fully extensible, providing in-line access to the supporting Stratego and C back-end. Of course, other embodiments may be implemented differently. Already, YATL has had much success in writing practical program transformations for C and C++ in a commercial setting. Successful transformation applications include debugging instrumentation, byte ordering, refactoring, compiler migration, and others. In these applications, it has taken much less time to write YATL tools than to perform the modifications by hand, as done conventionally.

What is claimed is:

1. A method for generating tools, comprising:
storing at least one Yet Another Transformation Language (YATL) program to transform a plurality of abstract syntax trees (ASTs) on a storage medium, the ASTs corresponding to target source code;
compiling the YATL program to produce at least one transformation program; and
executing the transformation program with the ASTs as input to produce a plurality of transformed ASTs;
wherein the YATL program includes a tree traversal routine having access to a target symbol table, the target symbol table holding a plurality of symbols from the target source code, each symbol being associated with a unique scope identifier.

2. The method of claim 1, wherein the YATL program includes an "on" construct for altering a tree temporarily for a single action.

3. The method of claim 1, wherein the YATL program includes a "using" construct for altering a tree for a duration of a given compound statement.

4. The method of claim 1, wherein the YATL program includes a variable reference construct for permanently altering a tree across a plurality of rules and functions.

5. A system for generating tools, comprising:
a plurality of yet another transformation language (YATL) programs;
a YATL compiler for compiling the YATL programs;
a YATL parser for parsing the YATL programs using a YATL grammar;
a run time for executing YATL programs;
at least one storage device for storing the YATL programs, YATL compiler, YATL parser, and run time; and
a processor for compiling and executing the YATL programs, the YATL programs being operative on a plurality of abstract syntax trees (ASTs) to produce transformed ASTs;
wherein one of the YATL programs includes a tree traversal routine having access to a target symbol table, the target symbol table holding a plurality of symbols from the target source code, each symbol being associated with a unique scope identifier;
wherein the YATL program includes an "on" construct for altering a tree temporarily for a single action, a "using" construct for altering a tree for a duration of a compound statement, and a variable reference construct for permanently altering a tree across a plurality of rules and functions.

6. A non-transitory computer-readable medium storing instructions when processed using a processor cause the computing device to perform a method for generating tools, the instructions comprising:
a Yet Another Transformation Language (YATL) program having at least one statement, the statement selected from the group consisting of: a rule, a function definition, a callback function definition, a preprocessor directive, and a Stratego program;
wherein the rule includes "rule" followed by an identifier, rule parameters, and a compound statement, the function definition includes "sub" followed by the identifier, function parameters, and the compound statement, and the compound statement includes at least one YATL statement optionally followed by an else clause;
wherein the YATL program includes a tree traversal routine having access to a target symbol table, the target symbol table holding a plurality of symbols from a target source code, each symbol being associated with a unique scope identifier.

7. The non-transitory computer-readable medium of claim 6, wherein the YATL statement is selected from the group consisting of: a foreach-match statement, a match-once statement, a match statement, a foreach-element statement, a debug statement, a native statement, a print statement, a log statement, an express "on" statement, an isolated statement, a continue statement, a die statement, an "on" statement, a statement insertion statement, a layout insertion statement, an if statement, a while statement, a do while statement, a for statement, a delete statement, a transform decl statement, a transform use statement, a replace with statement, a return statement, a try catch statement, an either or statement, a fail statement, an on file statement, and a pointer declare statement.

8. The non-transitory computer-readable medium of claim 7, wherein the expression statement is selected from the group consisting of: "(" followed by an expression followed by ")", an assignment expression, a term expression, a new expression, a match condition expression, a logical expression, a "!" followed by an expression, an arithmetic expression, a conditional expression, a unary expression, and a pointer dereference.

9. The non-transitory computer-readable medium of claim 8, wherein the assignment expression is selected from the group consisting of: a YATL variable followed by "=" followed by a right-hand-side assignment, a YATL pointer followed by "=" followed by the right-hand-side assignment, a "?(" followed by an assignment variable list followed by ")=" followed by the right-hand-side assignment.

10. The non-transitory computer-readable medium of claim 9, wherein the match condition expression includes a using qualifier followed by the match expression, the using qualifier being "using" followed by the expression.

11. The non-transitory computer-readable medium of claim 7, wherein the foreach-match statement is selected from the group consisting of: "foreach-match" followed by a plurality of super-type specifiers followed by a plurality of match actions, "foreach-match-rl" followed by the super-type specifiers followed by the match actions, and "foreach-match-bottomup" followed by the super-type specifiers followed by the match actions.

12. The non-transitory computer-readable medium of claim 7, wherein the match statement is selected from the group consisting of: a match-once expression followed by a plurality of match actions and a match-exact expression followed by the match actions.

13. The non-transitory computer-readable medium of claim 12, wherein the match-exact expression includes "match" followed by a plurality of super-type specifiers.

14. The non-transitory computer-readable medium of claim 7, wherein the YATL program includes an on-file statement having "on-file" followed by a string literal followed by the compound statement.

15. The non-transitory computer-readable medium of claim 7, wherein the YATL program includes a foreach-element statement having "foreach-element" followed by the compound statement.

16. The non-transitory computer-readable medium of claim 7, wherein the YATL program includes an either-or-statement having "either" followed by the compound statement followed by "or" followed by the compound statement and an either-or tail.

17. The non-transitory computer-readable medium of claim 7, wherein the YATL program includes a replace with statement having "replace-with" followed by an expression.

18. The non-transitory computer-readable medium of claim 7, wherein the YATL program includes a delete statement having "delete at" followed by a pointer dereference.

19. The non-transitory computer-readable medium of claim 7, wherein the YATL program includes a statement insertion statement having "insert-statement" followed by an expression followed by an insertion position.

20. The non-transitory computer-readable medium of claim 7, wherein the YATL program includes a layout insertion statement having "insert-layout" followed by a layout element followed by an insertion position.

21. The non-transitory computer-readable medium of claim 7, wherein the YATL program includes an "on" statement having "on" followed by a term expression followed by the compound statement.

22. The non-transitory computer-readable medium of claim 7, wherein the YATL program includes an "on" statement having "on" followed by an on pointer dereference followed by the compound statement.

23. The non-transitory computer-readable medium of claim 7, wherein the YATL program includes an isolate statement having "isolate" followed by another YATL statement.

24. The non-transitory computer-readable medium of claim 7, wherein the YATL program includes an isolate statement having "isolate" followed by the compound statement.

* * * * *